United States Patent
Bouaouaja et al.

(10) Patent No.: US 12,228,026 B2
(45) Date of Patent: Feb. 18, 2025

(54) MODELING RESERVOIR PERMEABILITY THROUGH ESTIMATING NATURAL FRACTURE DISTRIBUTION AND PROPERTIES

(71) Applicant: Saudi Arabian Oil Company, Dhahran (SA)

(72) Inventors: Mohamed Bouaouaja, Dhahran (SA); Otto Meza Camargo, Dhahran (SA); Marei Al-Garni, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 554 days.

(21) Appl. No.: 16/695,946

(22) Filed: Nov. 26, 2019

(65) Prior Publication Data
US 2020/0095858 A1     Mar. 26, 2020

Related U.S. Application Data

(63) Continuation-in-part of application No. 15/704,236, filed on Sep. 14, 2017, now Pat. No. 10,607,043.

(51) Int. Cl.
*E21B 44/00* (2006.01)
*E21B 47/10* (2012.01)
*G01V 1/46* (2006.01)

(52) U.S. Cl.
CPC .............. *E21B 44/00* (2013.01); *E21B 47/10* (2013.01); *G01V 1/46* (2013.01); *G01V 2210/6246* (2013.01)

(58) Field of Classification Search
CPC ...... E21B 44/00; E21B 47/10; E21B 2200/20; E21B 43/26; E21B 49/006; G01V 1/46;
(Continued)

(56) References Cited

U.S. PATENT DOCUMENTS

| 6,502,037 B1 | 12/2002 | Jorgensen et al. |
| 6,705,398 B2 | 3/2004 | Weng |

(Continued)

FOREIGN PATENT DOCUMENTS

| AU | 2013374225 B2 | 7/2014 |
| AU | 2018267575 B9 | 12/2018 |

(Continued)

OTHER PUBLICATIONS

Authors: Otto E. Meza Camargo, Dr. Tariq Mahmood and Dr. Ivan Deshenenkov Title: Reservoir Stress Path from 4D Coupled High Resolution Geomechanics Model: A Case Study for Jauf Formation, North Ghawar, Saudi Arabia (Year: 2016).*

(Continued)

*Primary Examiner* — Michael Edward Cocchi
(74) *Attorney, Agent, or Firm* — Bracewell LLP; Constance G. Rhebergen; Brian H. Tompkins

(57) ABSTRACT

Permeability in earth models has three components: natural fracture, distinctive matrix permeability and porosity correlated matrix permeability. While matrix permeability is usually predictable from porosity and diagenesis effects, fracture permeability can be a highly uncertain parameter. The earth model permeability components are calibrated by determining fracture distribution and estimating fracture properties through an iterative optimization process. The calibration proceeds iteratively until the current estimate of calculated reservoir flow capacity is within acceptable accuracy limits to reservoir flow capacity indicated from production logging tool measurements.

12 Claims, 12 Drawing Sheets

(58) Field of Classification Search
CPC ........... G01V 2210/6246; G01V 20/00; G01V 2210/63; G01V 2210/646; G01V 2210/663; G06F 30/20; G06F 30/25; G06F 30/27; G06F 30/28
See application file for complete search history.

(56) References Cited

U.S. PATENT DOCUMENTS

| | | | |
|---|---|---|---|
| 6,904,365 | B2 | 6/2005 | Bratton et al. |
| 7,025,138 | B2 | 4/2006 | Kurkjian et al. |
| 7,042,802 | B2 | 5/2006 | Sinha |
| 7,337,660 | B2 | 3/2008 | Ibrahim et al. |
| 7,457,194 | B2 | 11/2008 | Prioul et al. |
| 7,526,385 | B2 | 4/2009 | Sayers |
| 7,562,278 | B2 | 7/2009 | Lyakh et al. |
| 7,565,278 | B2 | 7/2009 | Li et al. |
| 7,679,993 | B2 | 3/2010 | Sayers |
| 7,707,018 | B2 | 4/2010 | Shaw |
| 7,941,307 | B2 | 5/2011 | Symington et al. |
| 8,010,294 | B2 | 8/2011 | Dorn et al. |
| 8,024,124 | B2 | 9/2011 | Sayers |
| 8,041,510 | B2 | 10/2011 | Dasgupta |
| 8,078,405 | B2 | 12/2011 | Delorme |
| 8,121,792 | B2 | 2/2012 | Hsu et al. |
| 8,204,727 | B2 | 6/2012 | Dean et al. |
| 8,301,427 | B2 | 10/2012 | Souche et al. |
| 8,374,836 | B2 | 2/2013 | Yogeswaren |
| 8,498,848 | B2 | 7/2013 | Habashy et al. |
| 8,619,500 | B2 | 12/2013 | Gray |
| 8,756,016 | B2 | 6/2014 | Tabanou et al. |
| 8,780,671 | B2 | 7/2014 | Sayers |
| 8,898,046 | B2 | 11/2014 | Moos et al. |
| 9,022,140 | B2 | 5/2015 | Marx et al. |
| 9,062,545 | B2 | 6/2015 | Roberts et al. |
| 9,063,251 | B2 | 6/2015 | Moos |
| 9,068,448 | B2 | 6/2015 | Hui et al. |
| 9,110,190 | B2 | 8/2015 | Yogeswaren |
| 9,152,745 | B2 | 10/2015 | Glinsky |
| 9,305,121 | B2 | 4/2016 | Yao et al. |
| 9,390,204 | B2 | 7/2016 | Bowen et al. |
| 9,417,348 | B2 | 8/2016 | Lin |
| 9,435,192 | B2 | 9/2016 | Lawrence et al. |
| 9,465,140 | B2 | 10/2016 | Crawford et al. |
| 9,618,652 | B2 | 4/2017 | Weng et al. |
| 9,677,393 | B2 | 6/2017 | Morris |
| 9,846,260 | B2 | 12/2017 | Mallet |
| 9,988,895 | B2 | 6/2018 | Roussel et al. |
| 10,001,003 | B2 | 6/2018 | Dusseault et al. |
| 10,101,498 | B2 | 10/2018 | Berard et al. |
| 10,190,406 | B2 | 1/2019 | Holland et al. |
| 10,302,785 | B2 | 5/2019 | Dirksen et al. |
| 10,310,137 | B1 | 6/2019 | Mallet |
| 10,352,145 | B2 | 7/2019 | Maxwell et al. |
| 10,422,208 | B2 | 9/2019 | Weng et al. |
| 10,465,509 | B2 | 11/2019 | Yao et al. |
| 10,528,681 | B2 | 1/2020 | Yogeswaren |
| 10,563,493 | B2 | 2/2020 | Ganguly et al. |
| 10,571,605 | B2 | 2/2020 | Crawford et al. |
| 10,572,611 | B2 | 2/2020 | Huang et al. |
| 10,607,043 | B2 | 3/2020 | Camargo et al. |
| 10,724,346 | B2 | 7/2020 | Eftekhari Far et al. |
| 10,760,416 | B2 | 9/2020 | Weng et al. |
| 10,787,887 | B2 | 9/2020 | Pankaj et al. |
| 10,853,533 | B2 | 12/2020 | Plateaux et al. |
| 10,920,538 | B2 | 2/2021 | Rodriguez Herrera et al. |
| 10,920,552 | B2 | 2/2021 | Rodriguez Herrera et al. |
| 11,098,582 | B1 | 8/2021 | Camargo et al. |
| 11,180,975 | B2 | 11/2021 | Renaudeau et al. |
| 11,313,994 | B2 | 4/2022 | Salman et al. |
| 11,434,759 | B2 | 9/2022 | Awan et al. |
| 11,599,790 | B2 | 3/2023 | Pandey et al. |
| 2007/0100594 | A1 | 5/2007 | Lamoureux-Var et al. |
| 2007/0255545 | A1 | 11/2007 | Pita et al. |
| 2007/0272407 | A1 | 11/2007 | Lehnman et al. |
| 2008/0071505 | A1 | 3/2008 | Huang et al. |
| 2009/0032250 | A1 | 2/2009 | Sarkar et al. |
| 2009/0319243 | A1 | 12/2009 | Suarez-Rivera et al. |
| 2010/0191470 | A1 | 7/2010 | Tabanou et al. |
| 2010/0250216 | A1* | 9/2010 | Narr ................ G06F 30/23 703/10 |
| 2012/0072188 | A1 | 3/2012 | Maerten et al. |
| 2013/0046524 | A1 | 2/2013 | Gathogo et al. |
| 2013/0297269 | A1 | 11/2013 | Davies et al. |
| 2013/0299241 | A1* | 11/2013 | Alberty ................ E21B 47/10 175/50 |
| 2014/0358510 | A1 | 12/2014 | Sarkar et al. |
| 2015/0129211 | A1 | 5/2015 | Dusseault et al. |
| 2015/0276979 | A1 | 10/2015 | Hugot et al. |
| 2016/0222765 | A1* | 8/2016 | Nooruddin ........... E21B 49/008 |
| 2016/0245939 | A1 | 8/2016 | Williams |
| 2016/0266274 | A1 | 9/2016 | Alqam et al. |
| 2016/0266278 | A1 | 9/2016 | Holderby et al. |
| 2016/0281498 | A1 | 9/2016 | Nguyen et al. |
| 2017/0038489 | A1* | 2/2017 | Pandey ................ G01V 1/282 |
| 2017/0051598 | A1 | 2/2017 | Ouenes |
| 2017/0052272 | A1 | 2/2017 | Maeso et al. |
| 2017/0132339 | A1 | 5/2017 | Umholtz et al. |
| 2017/0145793 | A1* | 5/2017 | Ouenes ................ E21B 43/26 |
| 2017/0176228 | A1 | 6/2017 | Elisabeth |
| 2017/0205531 | A1 | 7/2017 | Berard et al. |
| 2017/0254909 | A1 | 9/2017 | Agharazi |
| 2017/0316128 | A1* | 11/2017 | Huang ................ G06F 30/20 |
| 2018/0203146 | A1 | 7/2018 | Den Boer et al. |
| 2019/0080122 | A1* | 3/2019 | Camargo ................ G06G 7/48 |
| 2019/0345815 | A1 | 11/2019 | Mishra |
| 2020/0056460 | A1 | 2/2020 | Isaev et al. |
| 2020/0225382 | A1 | 7/2020 | Mallet et al. |
| 2020/0225383 | A1 | 7/2020 | Mallet et al. |
| 2020/0326322 | A1 | 10/2020 | Farrukh Hamza |
| 2021/0054736 | A1 | 2/2021 | Moos et al. |
| 2021/0102461 | A1 | 4/2021 | Kumar et al. |
| 2021/0132246 | A1 | 5/2021 | Liu et al. |
| 2021/0140313 | A1 | 5/2021 | Busetti |
| 2021/0222518 | A1 | 7/2021 | Bardy et al. |
| 2021/0350052 | A1 | 11/2021 | Alwahtani et al. |
| 2022/0018245 | A1 | 1/2022 | Coenen |
| 2022/0291418 | A1 | 9/2022 | Noufal |
| 2023/0012429 | A1 | 1/2023 | Camargo et al. |
| 2023/0084141 | A1 | 3/2023 | Camargo et al. |
| 2023/0333278 | A1 | 10/2023 | Camargo et al. |

FOREIGN PATENT DOCUMENTS

| | | |
|---|---|---|
| BR | PI1003737 A2 | 3/2012 |
| CA | 2778313 A1 | 6/2011 |
| CA | 2904008 A1 | 9/2014 |
| CA | 2932670 A1 | 12/2017 |
| CA | 3043231 A1 | 6/2018 |
| CN | 102042010 B | 1/2014 |
| CN | 102788994 B | 1/2015 |
| CN | 104459775 B | 3/2015 |
| CN | 105403929 A | 3/2016 |
| CN | 105484741 A | 4/2016 |
| CN | 103064114 B | 5/2016 |
| CN | 106285659 A | 1/2017 |
| CN | 104992468 B | 1/2018 |
| CN | 105134156 B | 5/2018 |
| CN | 108331555 A | 7/2018 |
| CN | 107578343 B | 7/2020 |
| CN | 107577831 B | 8/2020 |
| CN | 110850057 B | 4/2021 |
| CN | 112253103 B | 8/2021 |
| CN | 112065351 B | 9/2021 |
| CN | 109102180 B | 11/2021 |
| CN | 112526107 B | 11/2021 |
| CN | 109388817 B | 2/2022 |
| CN | 104500050 A | 10/2024 |
| EP | 3118758 A1 | 1/2017 |
| EP | 2179134 B1 | 1/2018 |
| EP | 3074957 B1 | 2/2022 |
| FR | 2979016 A | 2/2013 |
| KR | 101620506 B1 | 5/2016 |
| KR | 102211207 B1 | 5/2020 |
| RU | 2404359 C2 | 11/2010 |

(56) References Cited

FOREIGN PATENT DOCUMENTS

| | | | |
|---|---|---|---|
| WO | 2010111398 A2 | 9/2010 | |
| WO | 2013169256 A1 | 11/2013 | |
| WO | 2015168417 A1 | 11/2015 | |
| WO | 2016122792 A1 | 8/2016 | |
| WO | 2016209822 A1 | 12/2016 | |
| WO | WO-2017019388 A1 * | 2/2017 | ............ G01V 1/306 |
| WO | 2017216594 A1 | 12/2017 | |
| WO | 2019238451 A1 | 12/2019 | |
| WO | 2020167282 A1 | 8/2020 | |
| WO | 2020198210 A1 | 10/2020 | |
| WO | 2021108439 A1 | 6/2021 | |
| WO | 2021236877 A1 | 11/2021 | |

OTHER PUBLICATIONS

Authors: K. Fischer & A. Henk Title: Generating and Calibrating 3D Geomechanical Reservoir Models SPE Europec 2013 London UK (Year: 2013).*

Zoback, Mark D., Critically Stressed Faults and Fluid Flow, Reservoir Geomechanics, 2007, 2010, Chapter 11, pp. 340-377, Cambridge University Press, Cambridge, NY, US (Year: 2010).*

Shimizu, Hiroyuki, et al. "A study of the effect of brittleness on hydraulic fracture complexity using a flow-coupled discrete element method." Journal of Petroleum Science and Engineering 160 (2018): 372-383. (Year: 2018).*

International Search Report and Written Opiniong for International Application No. PCT/US2020/062069 (SA51044), report mail date Mar. 11, 2021; pp. 1-18.

Nejadi, Siavash et al.; "History matching and uncertainty quantification of discrete fracture network models in fractured reservoirs" Journal of Petroleum Science and Engineering 152 (2017); pp. 21-32.

Ahmadi, Mohammad Ali; "Toward Reliable Model for Prediction Drilling Fluid Density at Wellbore Conditions: a LSSVM Model" Department of Petroleum Engineering, Ahwaz Faculty of Petroleum Engineering; pp. 1-34.

Aksenov, A.A. et al.; "Prediction of Distribution of Hydrogen Sulfide in Oil-Gas Basins" Petroleum Geology: A digest of Russian literature on Petroleum Geology; vol. 16 (1979), No. 10 (Oct.); pp. 439-441.

Al-Nutaifi et al.; "Wellbore Instability Analysis for Highly Fractured Carbonate Gas Reservoir from Geomechanics Prospective, Saudi Arabia Case Study" International Petroleum Technology Conference, Kuala Lumpur, Malaysia, Dec. 10-12, 2014; pp. 1-10.

Aldrich, Jeffrey B. et al.; "'Sweet Spot' Identification and Optimization in Unconventional Reservoirs" Search and Discovery Article #80644 (2018); pp. 1-6.

ArcGIS; "How Kernel Density works" available as of Jan. 28, 2022 at: https://desktop.arcgis.com/en/arcmap/10.6/tools/spatial-analyst-toolbox/how-kernel-density-works.htm; pp. 1-3.

Barree, R.D. et al.; "Holistic Fracture Diagnostics" SPE 107877, Rocky Mountain Oil & Gas Technology Symposium, Denver, CO, Apr. 16-18, 2007; pp. 1-13.

Bisdom, Kevin et al.; "A geometrically based method for predicting stress-induced fracture aperture and flow in discrete fracture networks" AAPG Bulletin v. 100, No. 7 (Jul. 2016); pp. 1075-1097.

Bisdom, Kevin et al.; "The impact of in-situ stress and outcrop-based fracture geometry on hydraulic aperture and upscaled permeability in fractured reservoirs" (abstract only) Tectonphysics v. 690, Part A, Oct. 28, 2010; pp. 63-75.

Camargo, Otto E. Meza et al.; "Reservoir Stress Path from 4D Coupled High Resolution Geomechanics Model: a Case Study for Jauf Formation, North Ghawar, Saudi Arabia" Saudi Aramco Journal of Technology, Fall 2016; pp. 45-59.

Cao, Yang-Bing et al.; "Calculation Method and Distribution Characteristics of Fracture Hydraulic Aperture from Field Experiments in Fractured Granite Area" (abstract only), Springer Ling, Nov. 9, 2015; pp. 1-18.

Cappa, F. et al.; "Estimation of fracture flow parameters through numerical analysis of hydromechanical pressure pulses" Water Resources Research, American Geophysical Union, 2008, 44, pp. W11408; pp. 1-49.

Chen, Sheng et al.; "Prediction of sweet spots in shale reservoir based on geophysical well logging and 3D seismic data" Energy Exploration & Exploitation, vol. 35(2), 2017; pp. 147-171.

Engelder, Terry et al.; "Chapter 15: a Pore-Pressure Limit in Overpressured South Texas Oil and Gas Fields" pp. 255-267, AAPG Memoir 67, 1997; pp. 255-267.

Fischer, K. et al.; "A workflow for building and calibrating 3-D geomechoanical models—a case study for a gas reservoir in the North German Basin" Solid Earth, 4, (2013); pp. 347-355.

International Search Report and Written Opinion for International Application No. PCT/US2021/018379 (SA51284) report mail date May 28, 2021; pp. 1-16.

Jorgensen, Bo Barker et al.; "Bacterial Sulfate Reduction Above 100C in Deep-Sea Hydrothermal Vent Sediments" (Abstract only) Science, vol. 258, Issue 5089, Dec. 11, 1992; pp. 1756-1757.

Khadivi, Kourosh et al.; "Integrated fracture characterization of Asmari reservoir in Haftkel field" Journal of Petroleum Exploration and Production Technology, Jan. 4, 2022; pp. 1-21.

Koutsabeloulis, N.C. et al.; "Numerical geomechanics in reservoir engineering" Computer Methods and Advances in Geomechanics, A.A. Balkema, Rotterdam, The Netherlands, 1994; pp. 2097-2104.

Liu, Naizhen et al.; "Shale gas sweet spot identification and precise geo-steering drilling in Weiyuan Block of Sichuan Basin, SW China" Petroleum Exploration and Development, vol. 43, Issue 6, Dec. 2016; pp. 1-9.

Luthi, S.M. et al.; "Fracture apertures from electrical borehole scans" Geophysics, vol. 55, No. 7 (Jul. 1990); pp. 821-833.

Matyasik, Irena et al.; "Genesis of hydrogen sulfide in carbonate reservoirs" NAFTA-GAZ, ROK LXXIV, Nr Sep. 2018; pp. 627-635.

Orr, Wilson L.; "Changes in Sulfur Content and Isotopic Ratios of Sulfur during Petroleum Maturation—Study of Big Horn Basin Paleozoic Oils" The American Association of Petroleum Geologists Bulletin, V. 58, No. 11 (Nov. 1974); pp. 2295-2318.

Schlumberger; "Welcome to Techlog online help 2018.2" 2018; pp. 1-2.

Silverman, B.W.; "Density Estimation For Statistics and Data Analysis" Monographs on Statistics and Applied Probability, London: Chapman and Hall, 1986; pp. 1-22.

Sorkhabi, Rasoul, Ph.D.; "Locating Sweet Spots: Shale Petroleum Systems" available as of Dec. 28, 21 at: https://www.geoexpro.com/articles/2020/06/locating-sweet-spots-shale-petroleum-systems; vol. 17, No. 2-2020; pp. 1-10.

Tokhmchi, Behzad et al.; "Estimation of the fracture density in fractured zones using petrophysical logs" Journal of Petroleum Science and Engineering 72 (2010); pp. 206-213.

U.S. Appl. No. 17/463,153 (SA51648) titled "Determining Hydrogen Sulfide (H2S) Concentration and Distribution in Carbonate Reservoirs Using Geomechanical Properties" filed Aug. 31, 2021.

U.S. Appl. No. 17/476,914 (SA51643) titled "Identifying Fluid Flow Paths in Naturally Fractured Reservoirs" filed Sep. 16, 2021.

U.S. Appl. No. 17/690,484 (SA51689) titled "Geo-Mechanical Based Determination of Sweet Spot Intervals for Hydraulic Fracturing Stimulation" filed Mar. 9, 2022.

Worden, R.H. et al.; "Gas Souring by Thermochemical Sulfate Reduction by 140C1" The American Association of Petroleum Geologists Bulletin, V. 79, No. 6 (Jun. 1995); pp. 854-863.

Worden, Richard H. et al.; "Origin of H2S in Khuff Reservoirs by Thermochanical Sulfate Reduction: Evidence from Fluid Inclusions" Saudi Aramco Journal of Technology, Fall 2004; pp. 42-52.

Zhu, GuangYou et al.; "The controlling factors and distribution prediction of H2S formation in marine carbonate gas reservoir, China" (abstract only) Chinese Science Bulletin, vol. 52 (2007), pp. 150-163.

Alcantara, Ricardo et al.; "A Dynamic Characterization Approach for a Complex Naturally Fractured Reservoir" International Petroleum Technology Conference, Beijing, China, Mar. 26-28, 2019; pp. 1-40.

(56) References Cited

OTHER PUBLICATIONS

ArcGIS; "How Line Density works" available as of Jan. 18, 2022 at: https://desktop.arcgis.com/en/arcmap/10.6/tools/spatial-analyst-toolbox/how-line-density-works.htm; pp. 1-3.

ArcGIS Pro 2.8; "An overview of the Density toolset" available as of Apr. 4, 22 at: https://pro.arcgis.com/en/pro-app/2.8/tool-reference/spatial-analyst/an-overview-of-the-density-tools.htm; p. 1.

ArcGIS Pro 2.8; "How Kernel Density Works" Available as of Mar. 14, 22 at: https://pro.arcgis.com/en/pro-app/2.8/tool-reference/spatial-analyst/how-kernel-density-works.htm; pp. 1-6.

ArcGIS Pro 2.8; "Kernel Density (Spatial Analyst)" available as of Mar. 14, 2022 at: https://pro.arcgis.com/en/pro-app/2.8/tool-reference/spatial-analyst/kernel-density.htm; pp. 1-5.

ArcGIS Pro 2.8; "Line Density (Spatial Analyst)" available as of Apr. 4, 2022 at: https://pro.arcgis.com/en/pro-app/2.8/tool-reference/spatial-analyst/line-density.htm; pp. 1-6.

ArcGIS Pro 2.8; "Point Density (Spatial Analyst)" available as of Apr. 4, 2022 at: https://pro.arcgis.com/en/pro-app/2.8/tool-reference/spatial-analyst/point-density.htm; pp. 1-7.

Chen, Sheng et al.; "Prediction of sweet spots in shale reservoir based on geophysical well logging and 3D seismic data: A case study of Lower Silurian Longmaxi Formation in W4 block, Sichuan Basin, China" Energy Exploration & Exploitation, vol. 35(2), 2017; pp. 147-171.

Jiang, Le et al.; "Simulation and Optimization of Dynamic Fracture Parameters for an Inverted Square Nine-Spot Well Pattern in Tight Fractured Oil Reservoirs" Hindawi, Geofluids, vol. 2020, Article ID 8883803; pp. 1-9.

Liu, Shiqi et al.; "Geological and Engineering Integrated Shale Gas Sweet Spots Evaluation Based on Fuzzy Comprehensive Evaluation Method: A Case Study of Z Shale Gas Field HB Block" Energies 2022, 15, 602, Jan. 14, 2022; pp. 1-20.

Ouenes, Ahmed; "Stress Modeling '3-G' Workflow Pinpoints Shale Sweet Spots" The American Oil & Gas Reporter, Jul. 2015; pp. 1-3.

U.S. Appl. No. 17/712,820 (SA51702) titled "System and Method to Develop Naturally Fractured Hydrocarbon Reservoirs Using a Fracture Density Index" filed Apr. 4, 2022.

U.S. Appl. No. 17/721,064 (SA51697) titled "Identifying Naturally Fractured Sweet Spots Using a Fracture Density Index (FDI)" filed Apr. 14, 2022.

Wikipedia; "Kernel density estimation" available as of Apr. 4, 2022 at: https://en.wikipedia.org/wiki/Kernel_density_estimation#:~:text=In statistics%2C kernel density estimation, on a finite data sample; pp. 1-12.

Al-Hawas, K. et al., Delineation of fracture anisotropy signatures in Wudayhi Field by azimuthal seismic data; The Leading Edge, Interpreter's Corner, Dec. 2003; pp. 1202-1211.

Barton, C.A. et al., Fluid Flow Along Potentially Active Faults in Crystalline Rock, Geology; Aug. 1995; p. 683-686, v. 23, No. 8, US. The International Search Report and Written Opinion for related PCT application PCT/US2018/046824 dated Nov. 28, 2018.

Gan, Quan et al, A Continuum Model for Coupled Stress and Fluid Flow in Disrete Fracture Networks, Geomech. Geohys. Geo-energ. Geo-resour, 2016, 2:43-61, The Authors.

Gray, D. et al., "Fracture Detection in the Manderson Field: a 3D AVAZ", Case History: The Leading Edge, vol. 19, No. 11, 1214-1221.

Herwanger, J. et al.; Seismic Geomechanics—How to Build and Calibrate Geomchecanical Models Using 3D and 4D Seimic Data:, 1 Edn., EAGE Publications b.v. Houten, Chapters 2, pp. 19-39; Chapter 6 pp. 102-118, 2011.

Lei, Qinghua et al, The Use of Discrete Fracture Networks for Modelling Coupled Geomechanical and Hydrological Behaviour of Fractured Rocks, Computers and Geotechnics 85, 2017, pp. 151-176, The Authors, Published by Elsevier Ltd.

Maerten, F., Adaptive Cross-Approximation Applied to the Solution of System of Equations and Post-Processing for 3D Elastostatic Problems Using the Boundary Element Method, Engineering, May 21, 2009, pp. 483-491, University of Montpellier 2, Geosciences.

Min, Ki-Bok et al., Stress-Dependent Permeability of Fractured Rock Masses: A Numerical Study, International Journal of Rock Mechanics and Mining Sciences, 2004, pp. 1191-1210, vol. 41, Issue 7, Engineering Geology and Geophysics Research, Sweden.

Rogers S. et al., "Integrating discrete fracture network models and pressure transient data for testing conceptual fracture models of the Valhall chalk reservoir, Norway North Sea"; Geological Society, London, S. 2007, pp. 187-197.

Rogers, Stephen F., Critical Stress-Related Permeability in Fractured Rocks, Jan. 1, 2003, Chpt 2, Fracture and In-Situ Stress Characterization of Hydrocarbon Reservoirs, (AMEEN) Geoscience World, The Geological Society of London, 2003, pp. 7-16.

Zellou, A. et al.; "Fractured Reservoir Characterization Using Post-Stack Seismic Attributes—Application to a Hungarian Reservoir", Proc. 68th EAGE Conference and Exhibition, 2006.

Zoback, Mark D., Critically Stressed Faults and Fluid Flow, Reservoir Geomechanics, 2007, 2010, Chapter 11, pp. 340-377, Cambridge University Press, Cambridge, NY, US.

Akhmetova, A.A. et al.; "Evaluation of the applicability mini-fracturing data to determine reservoir pressure and transmissibility (Russian)." OIJ 2018 (2018); pp. 90-94.

Azari, Mehdi et al.; "Determining the Formation Properties with Innovative Formation Integrity Test Designed Using a Wireline Straddle Packer, a Field Example" SPWLA 59th Annual Logging Symposium, Jun. 2-6, 2018; pp. 1-12.

Blakely, Richard J.; "Potential Theory in Gravity and Magnetic Applications" Cambridge University Press, 1996; pp. 1-9.

Ferreira, Francisco J.F. et al.; "Enhancement of the total horizontal gradient of magnetic anomalies using the tilt angle" Geophysics vol. 78, No. 3 (May-Jun. 2013); pgs. J33-J41.

Friedman, Jerome H.; "Greedy Function Approximation: a Gradient Boosting Machine" 1999 Reitz Lecture, The Annals of Statistics (2001), vol. 29, No. 5; pp. 1189-1232.

Gunn, P. J.; "Linear Transformations of Gravity and Magnetic Fields" Geophysical Prospecting vol. 23, Issue 2, Jun. 1974; pp. 300-312.

Han, Jiahang et al.; "Stress Field Change Due to Reservoir Depletion and Its Impact on Refrac Treatment Design and SRV in Unconventional Reservoirs" SPE-178496-MS/URTeC:2144941; Unconventional Resources Tech. Conf., Texas, Jul. 20-22, 2015; pp. 1-11.

Jacquemyn, Carl et al.; "Mechanical stratigraphy and (paleo-) karstification of the Murge area (Apulia, southern Italy)" (abstract only) Geological Society, London, Special Publicationsvol. 370; pp. 169-186.

Miller, Hugh G. et al.; "Potential field tilt—a new concept for location of potential field sources" Journal of Applied Geophysics 32 (1994); pp. 213-217.

Mojeddifar, Saeed et al.; "Porosity prediction from seismic inversion of a similarity attribute based on a pseudo-forward equation (PFE): a case study from the North Sea Basin, Netherlands" Pet. Sci. (2015) 12; pp. 428-442.

Nolte, K.G. et al.; "After-Closure Analysis of Fracture Calibration Tests" SPE 38676, 1997 SPE Annual Technical Conference and Exhibition, San Antonio, TX, Oct. 5-8, 1997; pp. 333-349.

Phillips, Jeffrey D.; "Designing matched bandpass and azimuthal filters for the separation of potential-field anomalies by source region and source type" ASEG 15th Geophysical Conference and Exhibition, Aug. 2001, Brisbane; pp. 1-4.

Rezmer-Cooper, Iain M. et al.; "Real-Time Formation Integrity Tests Using Downhole Data" IADC/SPE 59123, 2000 IASC/SPE Drilling Conference, New Orleans, LA, Feb. 23-25, 2000; pp. 1-12.

Schultz, Ryan et al.; "The Cardston Earthquake Swarm and Hydraulic Fracturing of the Exshaw Formation (Alberta Bakken Play)" Bulletin of the Seismological Society of America, vol. 105, No. 6, Dec. 2015; pp. 1-14.

Spector, A. et al.; "Statistical Models for Interpreting Aeromagnetic Data" Geophysics, vol. 35, No. 2, Apr. 1970; pp. 293-302.

Tian, Fei et al.; "Three-Dimensional Geophysical Characterization of Deeply Buried Paleokarst System in the Tahe Oilfield, Tarim Basin, China" Water (2019) 11, 1045; pp. 1-18.

(56) References Cited

OTHER PUBLICATIONS

Van Lanen, Xavier et al.; "Integrated geologic and geophysical studies of North American continental intraplate seismicity" The Geological Society of America, Special Paper 425, 2007; pp. 101-112.

Wilson, Adam; "Common Mistakes Associated with Diagnostic Fracture Injection Tests" Journal of Petroleum Technology, Aug. 31, 2014; pp. 1-6.

Wynants-Morel, Nicolas et al.; "Stress Perturbation From Aseismic Slip Drives the Seismic Front During Fluid Injection in a Permeable Fault" JGR Solid Earth vol. 125, Issue 7, Jul. 2020; pp. 1-23.

Huang, Jian et al.; "Natural-hydraulic fracture interaction: Microseismic observations and geomechanical predictions" (abstract only) Interpretation (2015) 3 (3); pp. SU17-SU31.

Kayode, B. et al.; "Advances in Reservoir Modeling: a New Approach for Building Robust Reservoir Models" (abstract only) SPE-187993-MS, SPE KSA Annual Technical Symposium and Exhibition, Dammam, Saudi Arabia, Apr. 2017; pp. 1-6.

Meza, O. et al.; "Integration of Borehole Image Logs and Rock Mechanics for Critically Stressed Fractures Analysis in Weak Carbonates" (abstract only) 2nd EAGE Borehole Geology Workshop, Oct. 2017, vol. 2017; pp. 1-5.

Ochie, Karen Ifeoma et al.; "Geostatistics—Kriging and Co-Kriging Methods in Reservoir Characterization of Hydrocarbon Rock Deposits" SPE-193483-MS, Nigeria Annual International Conference & Exhibition, Lagos, Nigeria, Aug. 6-8, 2018; pp. 1-11.

Zeng, Qingdong et al.; "Numerical Simulation of Fluid-Solid Coupling in Fractured Porous Media with Discrete Fracture Model and Extended Finite Element Method" Computation (2015), 3; pp. 541-557.

* cited by examiner

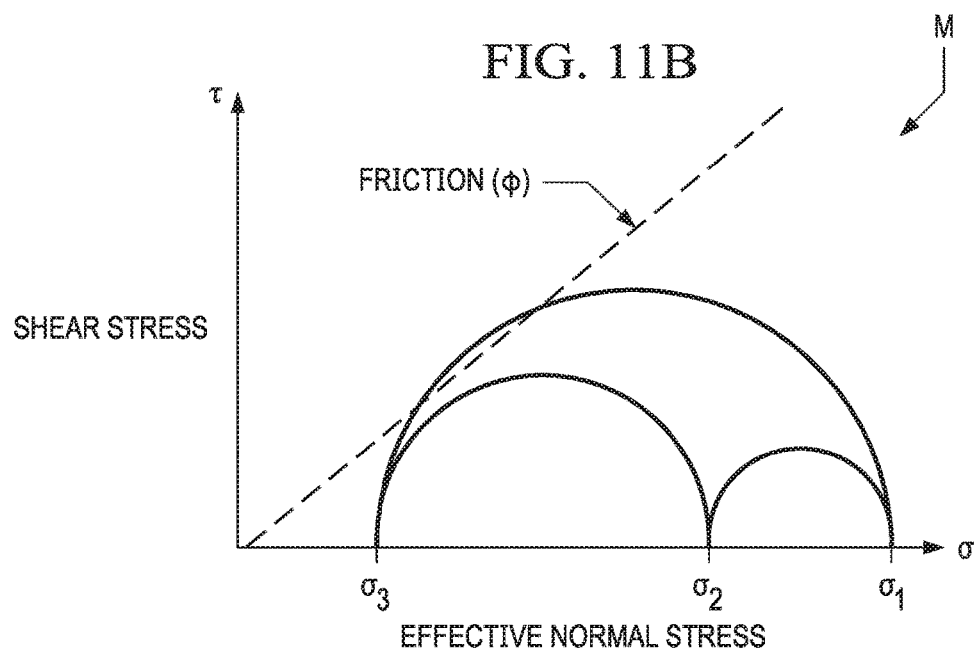
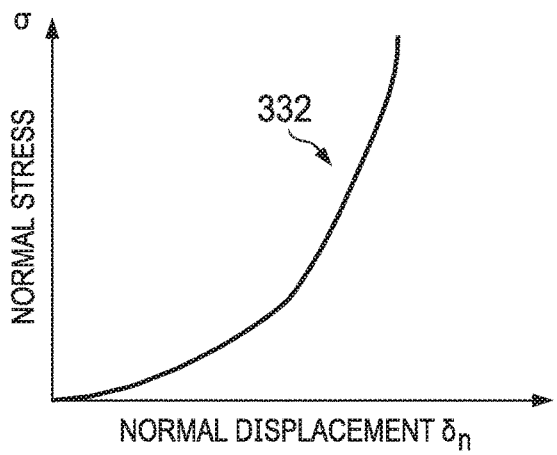
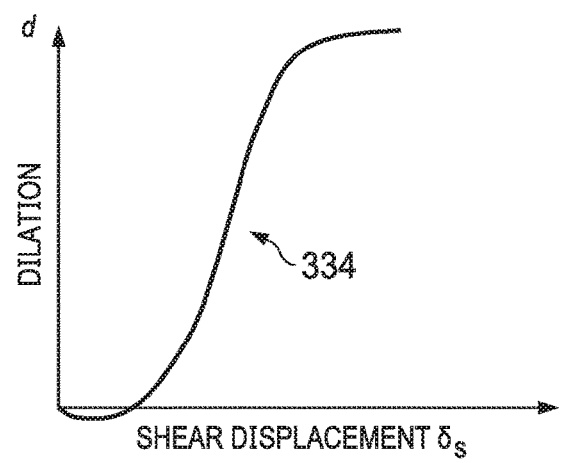

MODELING RESERVOIR PERMEABILITY THROUGH ESTIMATING NATURAL FRACTURE DISTRIBUTION AND PROPERTIES

CROSS-REFERENCE TO RELATED APPLICATIONS

The present application is a continuation in part of, and claims priority to, Applicant's co-pending, commonly owned U.S. patent application Ser. No. 15/704,236, "Subsurface Reservoir Model With 3D Natural Fractures Prediction" filed Sep. 14, 2017.

BACKGROUND OF THE INVENTION

1. Field of the Invention

The present invention relates to developing or forming models of subsurface reservoirs and estimating natural fracture distribution and properties to calibrate permeability for geological modeling of rock layers in subsurface reservoirs.

2. Description of the Related Art

Natural fractures present in subsurface formations are discontinuities representing a surface or zone of mechanical failure in the formation. Natural fractures have been formed over geological time as a result of movements and deformations within the subsurface rock over time. Natural fractures continue to be formed as a result of microseismic events which are slight tremors or movements in the earth's crust arising from various natural sources. Natural fractures are thus different in origin and nature from fractures induced in earth formations from the practice of hydraulic fracturing or fracking.

Natural fracture prediction is one of the more challenging problems in reservoir characterization. Fracture distributions are related to various factors such as intrinsic rock mechanics properties, as well as movements and deformation of the formation rock layers due to different tectonic stages to which the lithological formations are subjected through geological time. However, those parameters are usually unknown for the purposes of hydrocarbon exploration and development.

In highly complex geological environments due to different tectonics, understanding the natural fracture distributions and their properties can be important for conducting hydrocarbon exploration and development programs. A natural fracture can define a geological trap indicating possible flow passage for fluids in the reservoir. Natural fractures reduce the risk of unsuccessful results in drilling operations, and have an impact on reservoir management.

Hydrocarbons accumulate over geological time in a reservoir in the primary porous medium of the formation rock, and also in secondary porous media formed by natural fractures and in other areas of porosity such as vugs, caverns, and the like in the formation rock. Natural fractures as secondary storage mechanisms for hydrocarbon accumulation play an important role in some tight reservoir fields, enhancing the capacity to produce hydrocarbons from such reservoirs. Natural fractures enhance the permeability and connectivity between the primary porous media of the formation rock, and also support the flow of hydrocarbons into the wellbore. Natural fractures can also connect the porous and non-porous media of different rock layers of a reservoir in lower permeability conditions or situations.

Several techniques to build a natural fracture model have been described in the past, using different approaches. Examples include using seismic attributes from seismic exploration surveys for detection and distribution of natural fractures. Examples of this methodology are described in A. M. Zellou, T. Royer, G. C. Robinson, P. Zahuczki, A. Kirali, "Fractured Reservoir Characterization Using Post-Stack Seismic Attributes-Application to a Hungarian Reservoir", Proc. 68th EAGE Conference and Exhibition, 2006; where post-stack seismic attributes were used as a basis for natural fracture prediction.

Other approaches for natural fracture prediction have been used for formation rock near a wellbore. These approaches have included fracture characterization based on measurements detected along the wellbore through borehole imaging (resistivity or sonic), measurements based on rock properties (porosity, density, etc.) obtained from rock core samples and well logs, and by fracture characterization along the wells. For areas of a reservoir distant from wellbores, this approach was often of limited applicability, since the measurement detection capabilities of well logging tools and the ability to obtain rock core samples has been limited to regions in the immediate vicinity of the wellbore.

Another conventional approach has been to design a reservoir fracture network in a deterministic way into a 3D geological model using conceptual models and validating the results with engineering data. This approach is based on manual mapping of natural fractures based on the numbers of wells intersecting fractures and seismic discontinuity attributes. The number of fractures could be increased as needed during a history match process to match the well test data. An example of this approach can be found in Rogers. S., Enachescu C., Trice R., and Buer K., 2007, "Integrating discrete fracture network models and pressure transient data for testing conceptual fracture models of the Valhall chalk reservoir", Norway North Sea; Geological Society, London, Special Publication 2007, v. 270; p. 193-204. Other examples are in U.S. Pat. No. 7,565,278 (Li et al.); U.S. Pat. No. 9,390,204 (Bowen et al.); and U. S. Published Patent Application No. 2015/0276979 (Paradigm Sciences).

So far as is known, deterministic design of a reservoir fracture network relied on assumptions taking the fracture description from the wells and extrapolating those fracture descriptions into a grid model following a conceptual model. Such an approach was based on the reservoir being assumed to be one capable of representation as a simplistic model. Some assumptions for deterministic reservoir fracture network design were related to the natural fracture intensity (number of fracture/ft.). This deterministic method did not take into account fracture intensity indicated by borehole image logs or core descriptions from laboratory testing of formation core samples. Deterministic design assumptions also reduced the ability to predict or quantify natural fractures far from well locations. This additionally reduced reliability of reservoir fracture network model formed by deterministic design.

Fracture characterization and modeling of a reservoir has, so far as is known, been limited based on the acquired static data. The static data incorporates the geological features of the reservoir, including structure, stratigraphy, lithology and petrophysics of the subsurface formation rock.

Once a discrete fracture network has been identified, the accuracy of the fracture network model must be determined and confirmed. This has been done based on dynamic data, which are time dependent measures of flow and pressures in the reservoir wells under test conditions.

Previous techniques estimated permeability of the geocellular earth model considering a matrix component and fracture component. The fracture component was empirically calculated from theoretical correlations based on outcrop measurements relating fracture aperture to permeability. Multipliers were then identified to satisfy the pressure transient response or the production logging test (or PLT) flow profiles. The dynamic data has been used as input conditioning to alter data from which the discrete fracture network components have been determined. However, discrete fracture network fracture distribution and fracture permeability are independent physical conditions of a formation rock matrix.

If a well test showed high permeability in a region of interest, previous methods of fracture characterization and modeling indicated or assigned an area of increased permeability. However, so far as is known, previous methods did not differentiate whether the indicated high permeability was caused by fractures or high permeability streaks. With a model resulting from explicitly assigning a measured well test permeability around the zone of interest, it was not possible to determine whether the permeability resulted from a fracture, from vugs or from a high permeability matrix. Thus, the areal extent of the permeability phenomena could not be defined. This resulted in poor model predictability.

SUMMARY OF THE INVENTION

Briefly, the present invention provides a new and improved method of drilling a well in a subsurface geological structure to a location in a subsurface hydrocarbon reservoir indicated by a natural fracture network model of the reservoir. Reservoir parameters representing properties of the subsurface reservoir are obtained for processing in a data processing system. The natural fracture network model is then formed by processing the obtained reservoir parameters in the data processing system to identify fracture properties comprising the character, location, and stress conditions of natural fractures at locations in the subsurface hydrocarbon.

The processing determines fracture distribution based on the obtained reservoir parameters. A measure of estimated fracture properties of the subsurface reservoir is formed based on the determined fracture distribution. An estimated reservoir flow capacity is then obtained based on the formed estimate of reservoir fracture properties. An indicated flow capacity of the reservoir is also obtained. The estimated reservoir flow capacity is compared with indicated flow capacity of the reservoir.

If the estimated reservoir flow capacity is within acceptable limits of accuracy of the indicated flow capacity, a well is drilled in the subsurface geological structure to a location in the subsurface hydrocarbon reservoir based on the identified presence and extent of natural fractures in the subsurface geological structure. If not, an adjusted fracture distribution is determined and the formed estimate of reservoir fracture properties adjusted based on the adjusted fracture distribution. The steps of forming a measure of estimated fracture properties, obtaining an estimated reservoir flow capacity, and comparing the estimated reservoir flow capacity are then repeated.

BRIEF DESCRIPTION OF THE DRAWINGS

FIG. 11B is a Mohr diagram of rock coefficient of friction as a function of shear stress and effective normal stress for the heterogeneous stress field of FIG. 11A.

FIG. 12 is a diagram of fracture aperture changes in rock as a function of normal stress displacement of the rock.

FIG. 13 is a diagram of fracture aperture changes in rock as a function of shear dilatation of the rock.

DETAILED DESCRIPTION OF THE PREFERRED EMBODIMENTS

Figure 1:
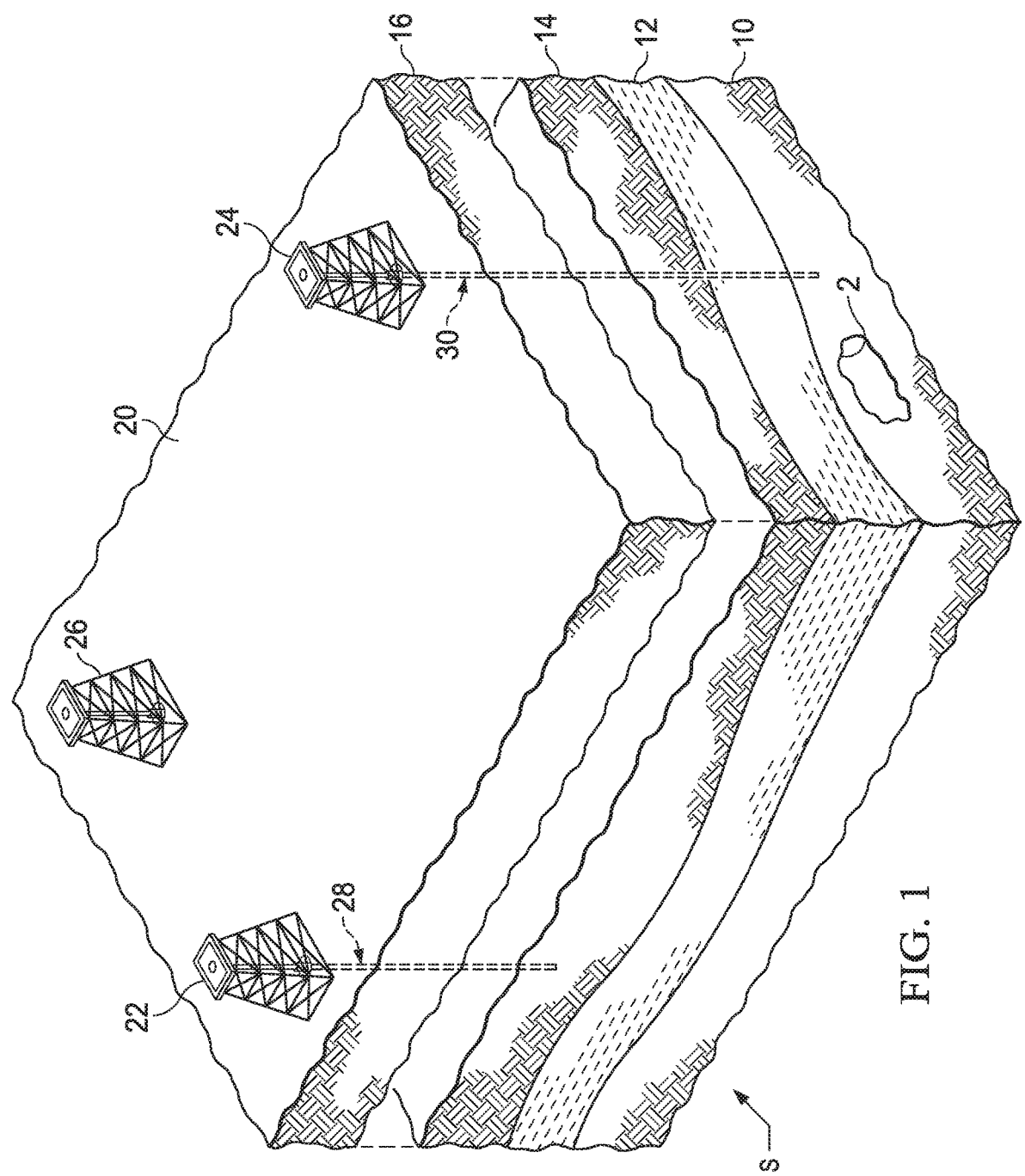
FIG. 1 is a schematic diagram of three dimensional subsurface formations in the earth at a location of interest where wells and a subsurface reservoir are present.

In the drawings, FIG. 1 is an isometric view in schematic form of subsurface geological structure S or formations in the earth at a location where a subsurface hydrocarbon reservoir R in the form of a hydrocarbon producing formation rock layer 10 is present. As shown in FIG. 1, the hydrocarbon producing formation rock layer 10 is present beneath several other formation rock layers, such as indicates at 12, 14 and 16 below the earth surface 20. As indicated at 22, 24 and 26, exploratory or production wells have been drilled to penetrate the earth formations through wellbores as indicated at 28 and 30.

Figure 2:
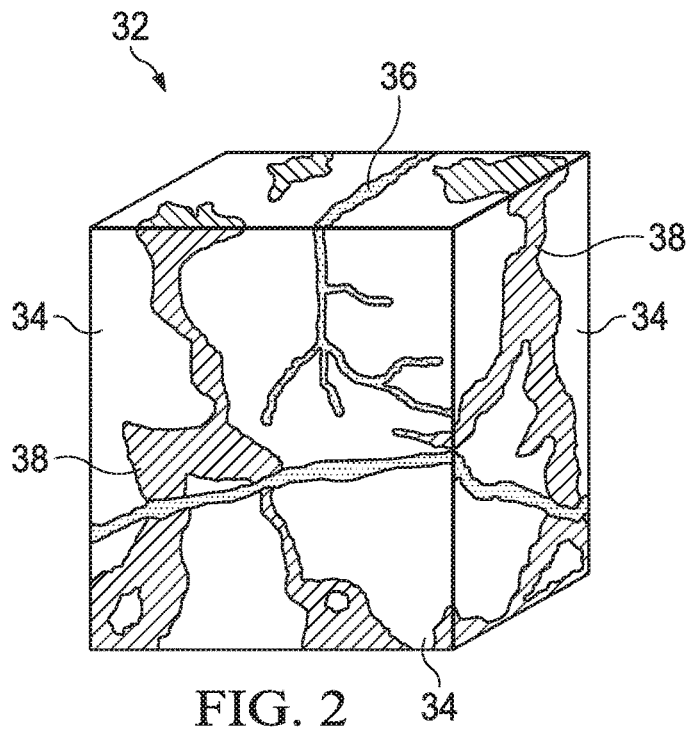
FIG. 2 is a much enlarged view of a portion of a subsurface formation of FIG. 1 showing a permeability system as related to fracture, matrix and vugular porosity of the rock of the formation.

FIG. 2 is a much enlarged view showing a schematic three-dimensional very small segment or portion 32 of the subsurface hydrocarbon producing formation rock layer 10 of FIG. 1. The segment 32 is formed as indicated at 34 of the primary porous medium of the formation rock. An irregular system of microscopic fractures 36 and small cavities or vugs 38 are typically present in the primary porous rock medium 34. Natural fractures in reservoirs can also be present across a wide range of scale, ranging from those shown in FIG. 2 in the form of microfractures to extensive fractures or faults of thousands of meters. The vertical extent of natural fractures is often controlled by thin layers in the form of shale beds or laminations, or by weak layers of rock in carbonate sequences in the earth.

Figure 3:
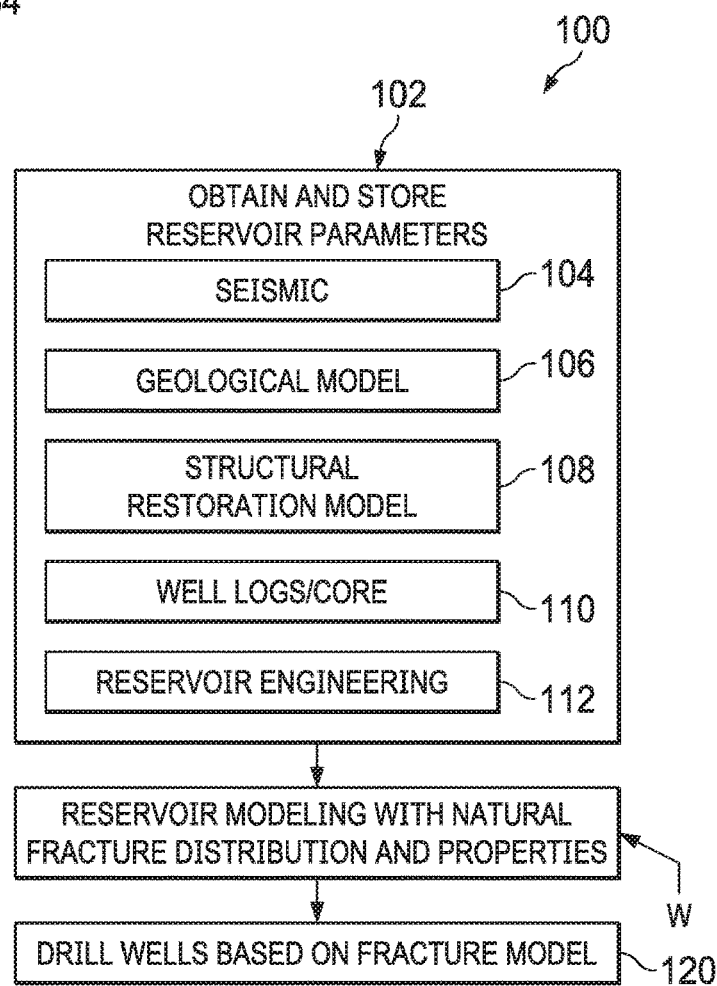
FIG. 3 is a schematic diagram of workflow for reservoir hydrocarbon exploration with natural fracture model prediction according to the present invention.
Figure 7:
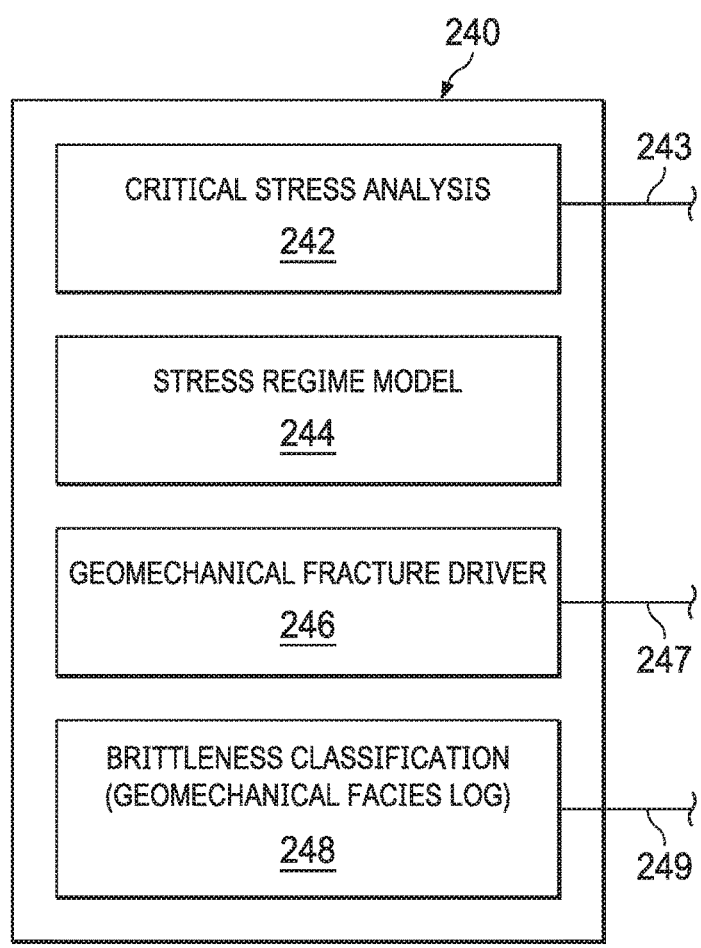
FIG. 7 is a schematic diagram of workflow of a component portion of the workflow of FIG. 4.

As shown schematically in FIG. 3, a schematic diagram of the methodology of the present invention for reservoir hydrocarbon exploration, and in particularly the location and completion of wells for hydrocarbon production is illustrated schematically at 100. As indicated at 102 in FIG. 3, reservoir parameters and properties from a plurality of disciplines of earth science are obtained, assembled and stored in a data processing system D (FIG. 7). As shown at 102, the reservoir parameters include seismic attributes from seismic surveys as indicated at 104; rock and mechanical properties from geological modeling as indicated at 106; measures from structural restoration models as indicated at 108; rock geological characterizations as indicated at 110 obtained from formation core samples and well logs performed in the wellbores such as 32 and 34; and reservoir engineering measures obtained as indicated at 112 from production measures and reservoir simulations of the reservoir layer 10.

As indicated at W, and as shown in more detail in FIGS. 4 through 10, the assembled reservoir parameters from step 102 are subjected to reservoir modeling and with natural fracture distribution and properties determination. The drilling of additional wellbores of the types already present, as indicated schematically at 32 and 34, is then performed as shown 120. The drilling during step 120 is at locations indicated appropriate by the models resulting from processing steps according to the workflow W. Drilling during step 120 is thus directed to regions of the reservoir layer 10 where fractures of the types conducive to increased production are likely to be present. Drilling during step 120 is also enhanced by drilling to avoid formations or layers regions not indicated to be hydraulically conductive. Drilling during step 120 is also improved by avoiding areas indicated to contain fractures likely to cause complications in drilling operations or otherwise adversely impact drilling operations. With the present invention, wells are drilled based on the fracture modeling of natural fracture characteristics of subsurface reservoir formations. The fracture models reflect the influence of several measures of formation parameters obtained from several disciplines.

Figure 4:
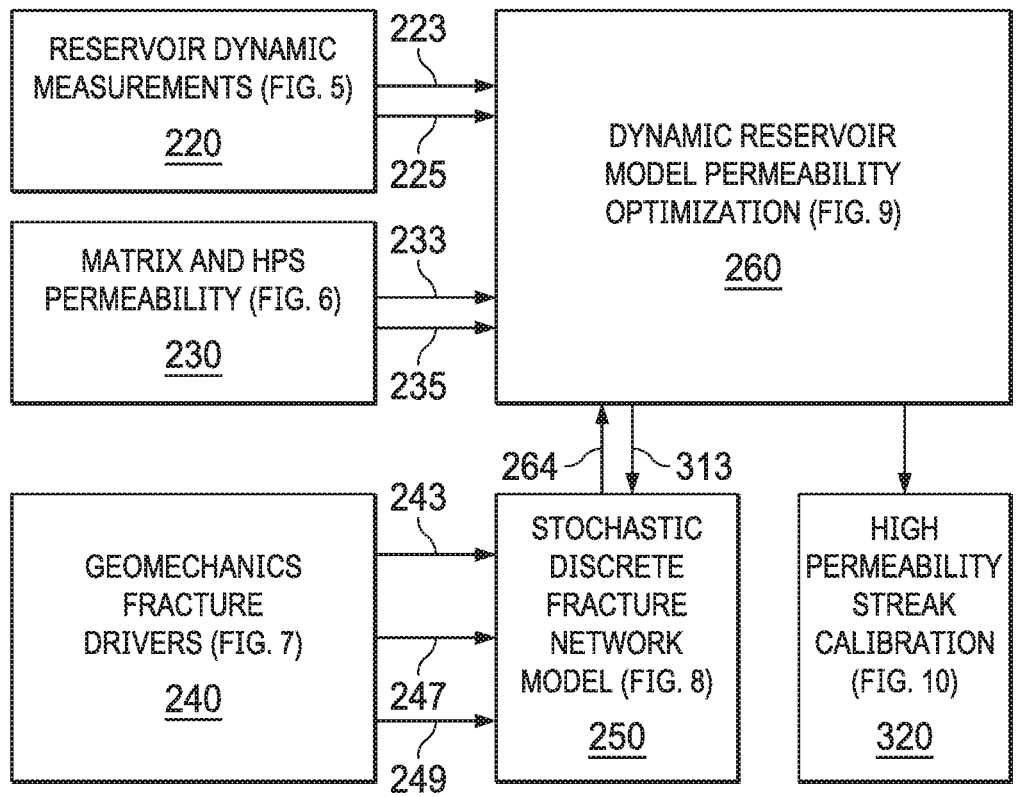
FIG. 4 is a high level schematic diagram of workflow for reservoir modeling of natural fracture distribution and properties according to the present invention.
Figure 5:
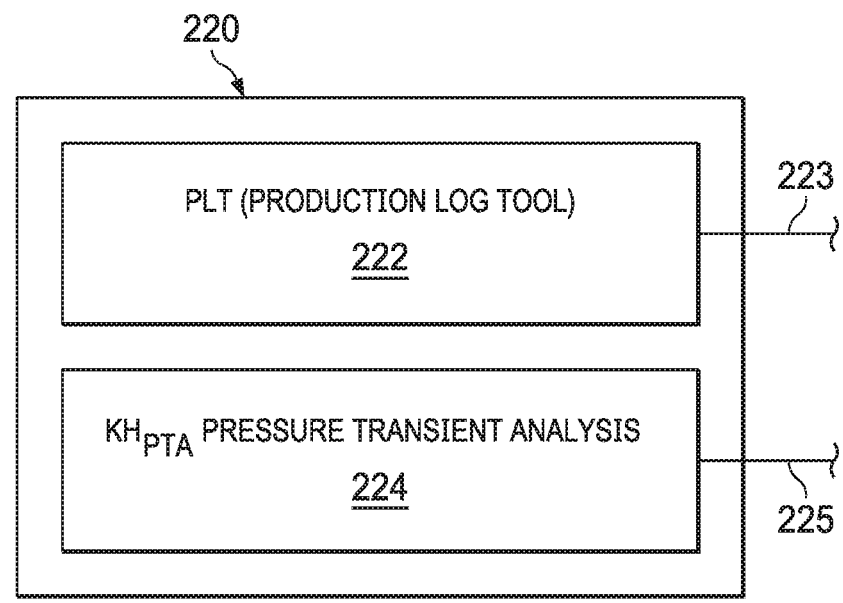
FIG. 5 is a schematic diagram of workflow of a component portion of the workflow of FIG. 4.
Figure 6:
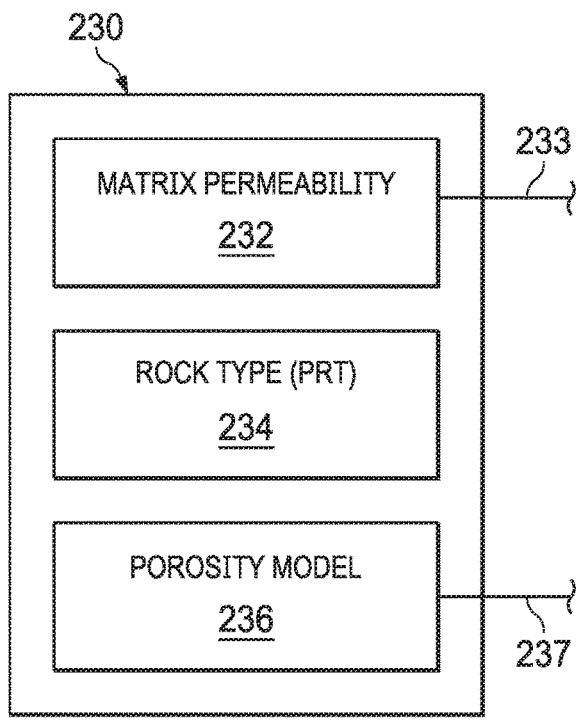
FIG. 6 is a schematic diagram of workflow of a component portion of the workflow of FIG. 4.

The processing according to workflow W is shown schematically in FIG. 4 designates generally a workflow for reservoir modeling of natural fracture distribution and properties according to the present invention. Permeability in earth models has three components: natural fractures, distinctive matrix permeability, and porosity correlated matrix permeability. The distinctive matrix permeability is normally predictable and can be obtained from porosity and diagenesis effects. However, determination of fracture permeability to a useful degree of confidence has, so far as is known, been difficult.

The present invention provides measures of determined fracture distribution for a geocellular model of a subsurface reservoir, and provides estimated fracture properties of the model. This is done, as will be described, by determining fracture distribution and estimating fracture properties through an iterative optimization process. This process progresses iteratively until reservoir flow capacity of the model, based on estimated fracture properties, differs from actual measured reservoir flow capacity by less than a specified accuracy or convergence limit. The present invention provides a discrete fracture network scaled to a geocellular earth model of the subsurface reservoir, and wells matrix calibrating coefficients for use in reservoir simulation and in estimating reservoir production.

Methodology

The present invention provides a methodology to validate a discrete fracture network in the reservoir, and forms estimates of earth model permeability based on the parametrization of multiple stochastic discrete fracture network (DFN) realizations or postulated fracture distributions, including whether the fractures are hydraulically conductive of fluids.

A hierarchy is established to calculate the equivalent permeability for the three components, where fractures have the major impact for the fluid flow movement, followed by high permeability streaks or HPS, then conventional matrix porosity. Using this hierarchy, the flow capacity is calculated for each component and optimized using the reservoir dynamic response to production logging tests.

As will be explained, the determination of fracture permeability is based on stress conditions on the formation rock. The present invention then determines through optimization processing an optimum set of permeability component parameters to satisfy a measured dynamic reservoir pressure and flow response to a production logging tool test.

Petrophysical Properties and Principles

The natural fractures prediction according to the present invention forms a geomechanical model of the subsurface rock. Formation of the geomechanical model includes in the processing an in situ stress regime and the effects of paleo-stress deformation accumulated over geological time. In the context of the present invention, the in situ stress regime is a condition where the stress field is unperturbed or is in equilibrium without any production or influences of perforated wells. The natural fracture system is closely related with current and past deformation due to the stress variation through the geological time. Different types of fractures can be formed in the formation rock during those deformation episodes.

As shown schematically in FIG. 7, the methodology of the workflow W is organized into two components or stages: a Data Input and Conditioning Stage or Component C and a Process Engine Stage or Component E.

Data and Input Conditioning Stage C

The Data and Input Conditioning Stage C receives input measurements from laboratory tests, well logs, well measurements and performance data for present invention. The measurements are of three types or categories, which are: reservoir dynamic measurements, as indicated by a Reservoir Dynamic Measurements Module 220 (FIG. 5); matrix and high permeability streaks (HPS) as indicated by a Matrix and HPS Module 230 (FIG. 6); and geomechanical drivers to constrain discrete fracture network (DFN) realizations, as indicated by a Geomechanical Fracture Drivers Module 240 (FIG. 7).

Reservoir Dynamic Measurements Module 220

The reservoir dynamic data are acquired by field measurements in the wells, these measurements quantified the total or segregate fluid production, total flow capacity, damage factor, etc. In most of the case this kind of test are unable to evaluate the natural fracture response and distinguish it from matrix or HPS features. However, the total flow capacity (KH) can be estimated as well as the contribution of individual intervals. These measurements are obtained from two kind of test the PLT (Production Log Tool) 222 and PTA (Pressure Transient Analysis) 224.

Production Log Tool (PLT) 222

Figure 9:
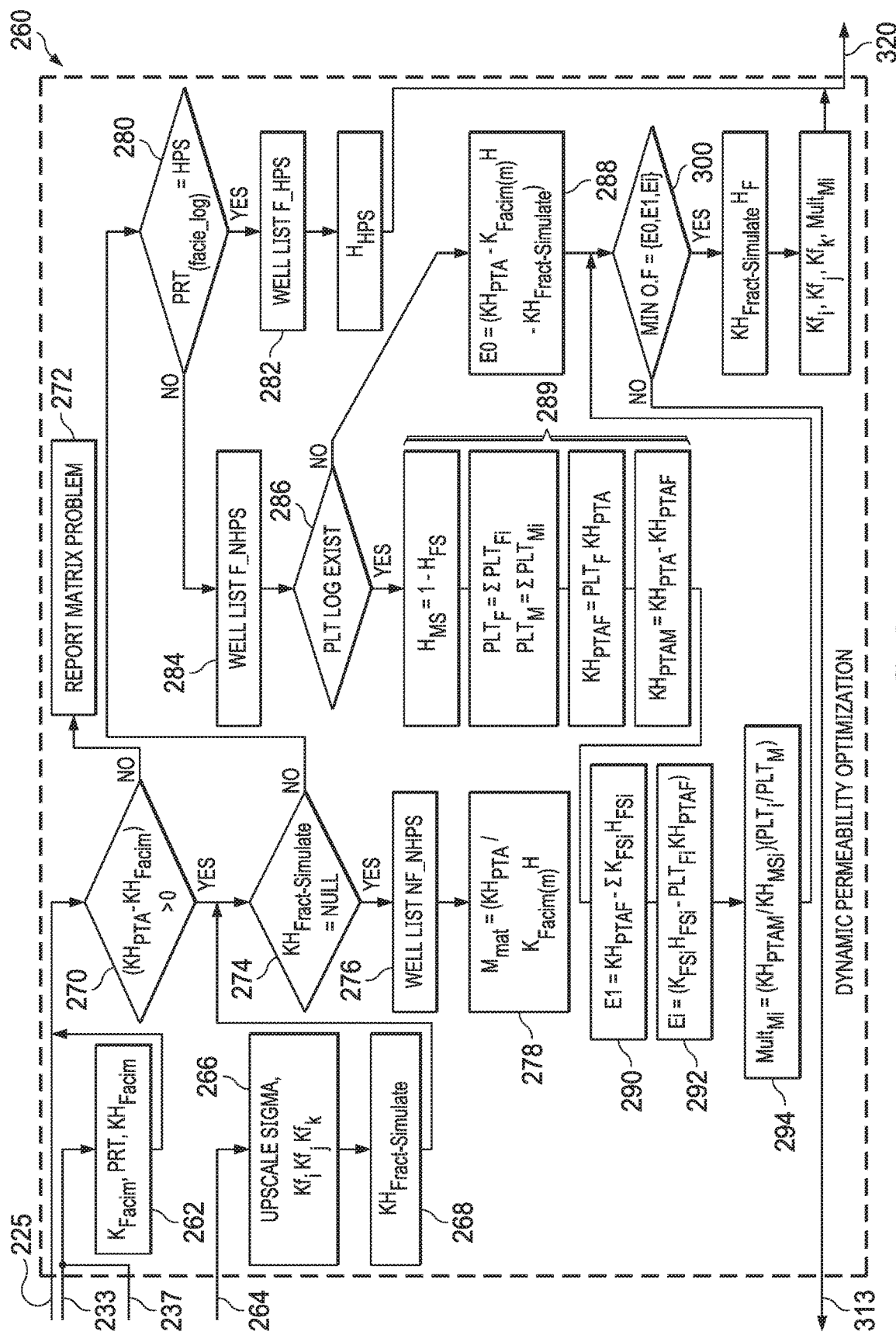
FIG. 9 is a schematic diagram of workflow of a component portion of the workflow of FIG. 4.

Production logging tools in well boreholes in a reservoir measure as indicated at 222 the nature and behavior of fluids and fluid distribution in or around the borehole during production or injection. Production logs are used to analyze dynamic well performance and productivity or injectivity, in particular the production or injection flow profile as function of depth in a well bore. The production logging tool measurement data 222 is provided as indicated at 223 as an input to a dynamic reservoir model permeability optimization module 260 (FIG. 9). The production logging tool measurement data 222 is provided as indicated at 223 as an input to a dynamic reservoir model permeability optimization module 260 (FIGS. 4 and 9).

Pressure Transient Analysis (PTA) 224

The pressure transient analysis performed as indicated at 224 determines a measure of indicated or estimated actual flow capacity from producing formations in the reservoir. The analysis is based on measurements of the reservoir pressure changes over time during what are known as pressure transient tests. In such testing, a limited amount of fluid flows from the formation being tested, and pressure at the formation is monitored over time. Then, the well is closed and the pressure monitored while the fluid within the formation equilibrates. Analysis of these pressure changes provides information on the size and shape of the reservoir, as well as its ability to produce fluids. The flow total flow capacity (KHPrA) of a well is a main input variable utilized according to the present invention workflow. The indicated or estimated actual flow capacity results from pressure transient analysis are provided as indicated at 225 to the dynamic reservoir model permeability optimization module 260. The indicated actual flow capacity results from pressure test analysis 224 are provided as shown at 225 to the dynamic reservoir model permeability optimization module 260.

Matrix and HPS Permeability 230

Matrix permeability 232 ($K_{Facim} = K_{Matrix}$), can be calculated and modeled from petrophysical workflows using a combined core test and wireline log data. The matrix permeability must be modeled into a conventional 3D geocellular grid, using algorithms for correlations and distribution.

There are typically high permeability streaks (HPS) in a producing formation matrix. The high permeability streaks are separate from natural fractures and are features related mainly to carbonate environments. High permeability streaks correspond to intervals with high permeability due to the presence of vuggy porosity or other diagenetic features in the rock matrix. The presence of HPS intervals can be detected partially by the conventional permeability workflow for matrix using a comprehensive characterization of the rock types. However, in some cases those intervals cannot be quantified correctly due to bad borehole conditions and may thus be underestimated. In such cases, additional corrections may be provided, such as those from what is known as a MHPs parameter. The matrix permeability model formed at 232 is provided as shown at 233 to the dynamic reservoir model permeability optimization module 260.

Petrophysical rock Type (PRT) 234 inputs are data relating to the petrophysical rock types. The PRT input data 234 are computed based on core-plugs test laboratory measurements. The relationships between the permeability and porosity for the rock matrix are subdivided by using pore throat size distribution and a known theoretical model such as the Winland (R35) method. The output of the petrophysical rock type process 234 is data indicating the quality of the rock in terms of its permeability in order to quantify the High Permeability Streaks (HPS) for the 3D geocellular model.

Porosity 236: A matrix porosity model 236 is computed based on results obtained from a porosity well log derived from petrophysical interpretation. The porosity well log is scaled up to the 3D grid resolution. Geostatistical algorithms and correlations are applied to determine porosity of formation rock at locations between the wells and as a result the porosity is modeled. The matrix porosity model formed as indicated at 236 is provided to the dynamic reservoir model permeability optimization model 260 as indicated at 237.

Geomechanics Fracture Drivers 240

Discrete fracture network realizations formed according to the present invention are constrained by geomechanical drivers. The parametrization of the main variable to constrain the fracture presence or position into a 3D geo-cellular grid includes several physical characteristics of the rock matrix, typically including: fracture density, fracture length, fracture orientation and geometry. The physical characteristics are obtained according to the present invention based on input obtained regarding matrix and provided the data processing system D in the form of controlling by Borehole Image Interpretation (BHI), brittleness property 248, paleo-stress analysis and an "in-situ" stress regime 244. The fracture aperture and permeability are determined by critical stress analysis, which relates the stress distribution and the fracture planes.

Critical Stress Analysis 242

During step 242, a fracture model is formed based on critical stress analysis. Conventional methods to calculate fracture aperture (such as outcrops observations, core studies, and borehole image logs) have, so far as is known, generally produced heterogeneous apertures in the rock. Other methods have assumed constant aperture presence for a fracture model.

Figure 11A:
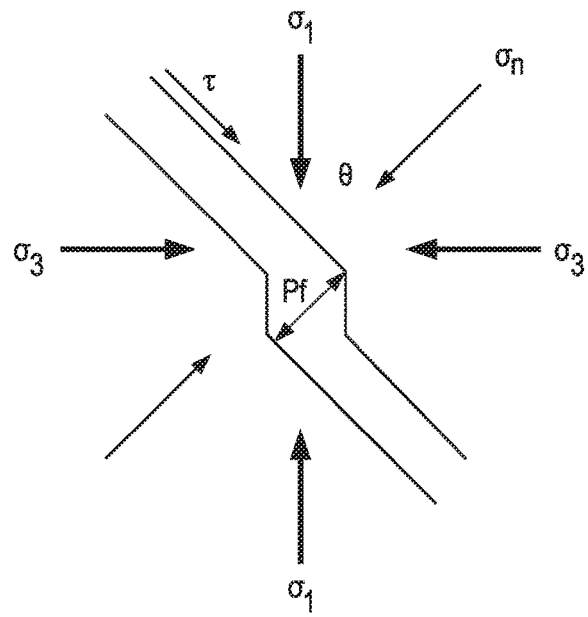
FIG. 11A is a diagram of stress forces and fracture plane orientation in an in situ heterogeneous stress field in subsurface rock.

FIG. 11A is a schematic diagram of a fracture model F-1 of an in situ heterogeneous stress field with a constant aperture $P_f$ in a representative segment of a subsurface formation. However, with the present invention it has been found that a conventional model such as FIG. 11A is not directly representative of stress conditions during actual flow through a fracture network. Analysis of subsurface data indicates not all fractures contribute to flow. According to the present invention, a formation fracture model is formed, as will be described, at 242. The formation fracture model so formed has only a determined portion of the discrete fraction network hydraulically open for passage of flow. Determination of such a portion and its distribution in the rock is based on whether the fractures are critically stressed. In determining critical stress, a physical phenomenon known as the Coulomb friction criterion is applicable.

The Coulomb criterion depends on the stress magnitude and the orientation of the fracture in the in situ heterogeneous stress field present in a formation. The fracture orientation with respect to the stress directions has significant impact on determination of normal and shear stresses on a fracture plane. When shear stress exceeds shear stiffness, shearing causes dilation keeps the fracture hydraulically open. Fractures in this stress state are referred to as reactivated or critically stressed. Fractures in this stress state are according to the present invention defined as critically stressed fractures in calculating the fracture aperture as a function of the shearing dilatations, as will be described.

Critical stress analysis is a function of normal stress $\sigma_n$, shear stress $\tau$ and fluid pressure. In the example fracture model F-1 shown in FIG. 11A, normal stress $\sigma_n$ is expressed according to Equation (1) as follows:

$$\sigma_n = 0.5*(\sigma_1+\sigma_3)+0.5*(\sigma_1+\sigma_3)*\cos 2\theta \quad \text{(Equation 1)}$$

The shear stress $\tau$ is expressed according to Equation (2) as follows:

$$\tau = 0.5*(\sigma_1-\sigma_3)*\sin 2\theta \quad \text{(Equation 2)}$$

In Equations (1) and (2), $\sigma_1$ and $\sigma_3$ are the maximum and minimum horizontal stresses in a horizontal plane-strain cross section of the fracture network $P_f$. $\theta$ is the angle between the plane of normal stress on and the direction of maximum stress $\sigma_1$ as shown in FIG. 11A. Further discussions are contained in *Reservoir Geomechanics*, Afark D. Zoback, Cambridge iUniversity Press, UK, 2007.

The relation between normal stress $\sigma_n$, shear stress $\tau$ and coefficient of friction $\phi$ in a rock matrix is represented graphically in what are known as Mohr diagrams or circles. An example Mohr diagram M (FIG. 11B) indicates rock coefficient of friction $\phi$ as a function of shear stress $\tau$ and effective normal stress $\sigma_n$ for the heterogeneous stress conditions indicated schematically in FIG. 11A.

In the context of the present invention, the Mohr's diagrams are graphical representations in two or three dimensions of stress conditions in a rock mass at different planes oriented as functions of orientation angle $\theta_i$ of planes passing through a point of interest in the rock. The Mohr's circles permit determination at the point of interest of principal normal stresses $\sigma_{max}$ and $\sigma_{min}$, maximum and minimum shear stresses $\tau_{max}$, $\tau_{min}$ as well as the orientation of the principal planes. Details of Mohr's circles are explained, for example, in Mohr's Circle. Mohr's Circle, Wikipedia. April, 2019, https://en.wikipedia.org.Mohr%27s_circle. As will be explained, the Mohr's circles in FIG. 14B of a critical stress fracture model F-2 in FIG. 14A include a plot of rock coefficient of friction $\phi$ to indicate the physical phenomenon of critical stress.

Critical stress concept criteria are used during critical stress analysis processing 242 in the methodology of the present invention to obtain natural fracture properties. This is done governed by the Coulomb criterion, which depends on the stress magnitude and the orientation of the fracture plane with respect to the "In situ" stress orientation. The orientation impacts the normal and shear stresses on the fracture plane. The results of the critical analysis states 242 are provided as indicated at 243 as an input to stochastic discrete fracture network model 250.

When shear stress exceeds shear stiffness, shearing causes dilation and keeps the fracture hydraulically open, as described in Rogers, S. F. (2003), *Critical stress-related permeability in fractured rocks, Geol. Soc. London, Spec. Publ.*, 209(1), 7-16, doi:10.144/GSL. SP.2003.209.01.02. Fractures in this example critical stress state of fracture model F-2 are shown at 340 (FIG. 14A) are referred to be reactivated or critically stressed in contrast to non-critical stress fractures 342. This geomechanical feature is described in Barton, C. A., et al. (1995), *Fluid flow along potentially active faults in crystalline rock, Geology*, 23(8), 683-686, doi:10.1130/0091-7613(1995)023<0683:FFAPAF>2.3. CO;2, and in Rogers, S. F. (2003), previously cited.

Stress Regime Model 244

The "in-situ" stress regime of natural fracture distribution is preferably modeled using FEM software (Finite Element Model) techniques, which predicts a stress/strain tensor regime using mechanical boundary elements. FEM methods use geomechanics simulations to converge a proper solution under certain boundary stress conditions. Maximum principal horizontal stress model and magnitude are obtained by this methodology for each cell into the 3D Grid geo-cellular model as described in Herwanger, J., et al.: "*Seismic Geomechanics—How to Build and Calibrate Geomechanical Models using* 3D *and* 4D *Seismic Data*", 1 *Edn*., EAGE Publications b.v., Houten, 181 pp., 2011. There are several available software applications to model stress regimes, such as Visage finite element geomechanics simulator from Schlumberger, Ltd., or Abaqus FEA finite element analysis suite from ABAQUS, Inc.

Geomechanical Fracture Driver 246

The Borehole image information obtained from borehole image logging tools during step 110 (FIG. 3) is interpreted during the Geomechanical Fracture Driver processing 246 to provide natural fracture descriptions, including natural fracture type, dip angle, dip azimuth and intensity at well level. For natural fractures, the apparent aperture can also be estimated by using a normalized image through deep resistivity response. An apparent fracture aperture can be calibrated using real core-plug measurements at reservoir conditions. The borehole image interpretation data so formed during this stage is provided as input data as indicated at 247 to the Stochastic Discrete Fracture Network 250 for further processing. The fracture description is used to model the paleo-stress and geomechanical restoration.

The geomechanical restoration process is used to calculate stress and strain paleo-stress deformation by analyzing each geological tectonic episode. This analysis should preferably distinguish between the fractures created by folding process or by faulting process, creating possible strain/stress deformation for each process. Paleo-stress analysis regarding the fractures folding relation may be modeled using geomechanical restoration functionality such as that available in geological structural modeling analytical methodologies such that available as Kine3D from Emerson Paradigm Holding LLC., or that provided as Move Suite from Petroleum Experts, Inc. The faulting response may be modeled using boundary element methods (BEM) which are incorporate into available processing methods, such as Petrel software iBEM3D as described in "Adaptive cross-approximation applied to the solution of system of equations and post-processing for 3D elastostatic problems using the boundary element method," Engineering Analysis with Boundary Elements 34 (2010), p. 483-491, F. Maerten.

Rock Brittleness Property 248

A rock brittleness property is differentiated during step 248. When subjected to stress, brittle rock breaks without significant plastic deformation. Brittle materials absorb relatively little energy prior to fracture, even those of high strength. In a complex heterogeneous fracture rock mass, the brittleness property is modeled using neuronal network classification, taking as inputs the elastic properties and stress regime producing mechanical facies. Those mechanical facies preferably should have some proportional relation with the distribution of natural fractures. This correlation can be evaluated using histograms filtered by density fracture. The rock brittleness property data from states 248 is provided as shown at 249 as an input to the stochastic discrete fracture network 250.

Process Engine Stage E

Stochastic Discrete Fracture Network 250

The discrete fracture network or DFN processing 250 is a module which according to the present invention forms a computational stochastic discrete fracture network model on a stochastic or statistically random basis from inputs provided. The stochastic discrete fracture network 250 receives as inputs the borehole image information from geo-mechanics fracture driver 246 and rock brittleness property data from the module 248. Operation of the stochastic discrete fracture network 250 begins at a start step 252 to begin formation of a new realization of a computerized discrete fracture network model. Next, a discrete fracture network is formed representing parameters of fracture length and intensity during step 254 based on the received inputs. Step 254 may be performed, for example, according to the methodology of commonly owned U.S. patent application Ser. No. 15/704,236, filed Sep. 14, 2017, "Subsurface Reservoir Model with 3D Natural Fractures Prediction." Step 256 follows during which new values for a fracture aperture are formed in terms of area, porosity $\phi$, shear stress $\tau$ and effective normal stress $\sigma_n$. Step 256 is based on the results of the critical stress analysis 242. The stochastic discrete fracture network model so formed during step 256 represents geometrical properties of each individual fracture (e.g. orientation, size, position, shape and aperture), and the topological relationships between individual fractures and fracture sets.

A number of discrete fracture network realizations or postulated fracture distributions are formed during processing according to the present invention controlled by several sets of fracture parameters. The parameters for this purpose include fracture length, density, orientation, geometry, aperture and permeability. The individual discrete fracture network realizations so formed are distributed into a 3D geocellular grid to produce reliable stochastic fracture realizations, existing platform such as the Petrel™ fracture modeling package or other suitable commercially available software adapted to populate natural fractures.

The initial four parameters are distributed based on mechanical earth model properties such as borehole image interpretation, mechanical layering, paleo-stress inversion and the in-situ stress regime. The fracture aperture distribution is controlled according to the present invention by whether a fracture is at critical or non-critical state. This in turn controls whether the fracture to be hydraulically conductive or not, as has been described.

Stochastic fracture network realizations are formed based on continuous property model, such as fracture density, orientations and geometry. The geomechanics fracture driver modeled in the steps of: borehole image interpretation 110, rock brittleness property 248 and stress regime model 242 are provided as inputs to the stochastic discrete fracture network 250 for production of a probabilistic fracture realization for the model being formed.

Stress-Dependent Permeability Distributions

The stress regime predicted for the 3D grid model during previous step 244 is used in processing by stochastic discrete fracture network 250 to apply the Coulomb failure criteria to the fracture planes generated in the DFN models. As will be explained, application of Coulomb failure criteria results in the hydraulic closing of all fractures in the rock matrix which are not within the critically stressed orientation domain.

The fracture aperture $P_f$ is based on normal closure and shearing dilatation. Only near-critically-oriented fractures which are oriented to be subject to stress distinctions which are near critical can dilate. Shear dilation occurs only partially in the natural fractures present in the rock matrix. Other fractures in the rock matrix which are not subject to near critical stress do no exhibit dilation.

The physical phenomenon of near critical stress and its determination to model stress-dependent permeability for fractures are discussed in "Stress-Dependent Permeability of Fractured Rock Masses: A Numerical Study", Ki-Bok Min et al., *International Journal of Rock Mechanics and Mining Sciences*, Volume 41, Issue 7, 2004, Pages 1191-1210, ISSN 1365-1609. The present invention further incorporates the effects of both normal closure and shear dilation of fractures as described for example in "A continuum model for coupled stress and fluid flow in discrete fracture networks" (Quan Gan et al., *Geomech. Geophys. Geo-energ. Geo-resour.* (2016) 2:43-61; and "The use of discrete fracture networks for modelling coupled geomechanical and hydrological behaviour of fractured rocks" (Qinghua Lei et al., *Computers and Geotechnics journal*, 2016.)

FIGS. 12 and 13 illustrate basic mechanisms of aperture changes resulting from two basic fracture deformations as observed in numerous laboratory experiments and the states of stress on fractures. The change in fracture aperture occurs from two basic mechanisms. FIG. 12 illustrates changes in fracture aperture as a result of normal stress-induced closure or opening. FIG. 13 illustrates changes in fracture aperture as a result of shear stress-induced dilation.

As shown at 332 in FIG. 12, in normal stress-displacement relation the response shows well-known hyperbolic behavior of stiffer fractures with increasing compressive normal stresses. The normal deformation of a fracture is more sensitive at lower magnitudes of normal stresses.

Shear dilation occurs as a result of overriding asperities of two rough fracture surfaces and may reach a stationary value with increasing fracture shearing, as shown at 334 in FIG. 13. Such shear dilation of fractures is important, since its magnitude can be significantly larger than the normal stress-induced closure or opening. The model formed according to the present invention considers permeability changes from normal and shear stresses as being independent of each other.

Figure 14A:
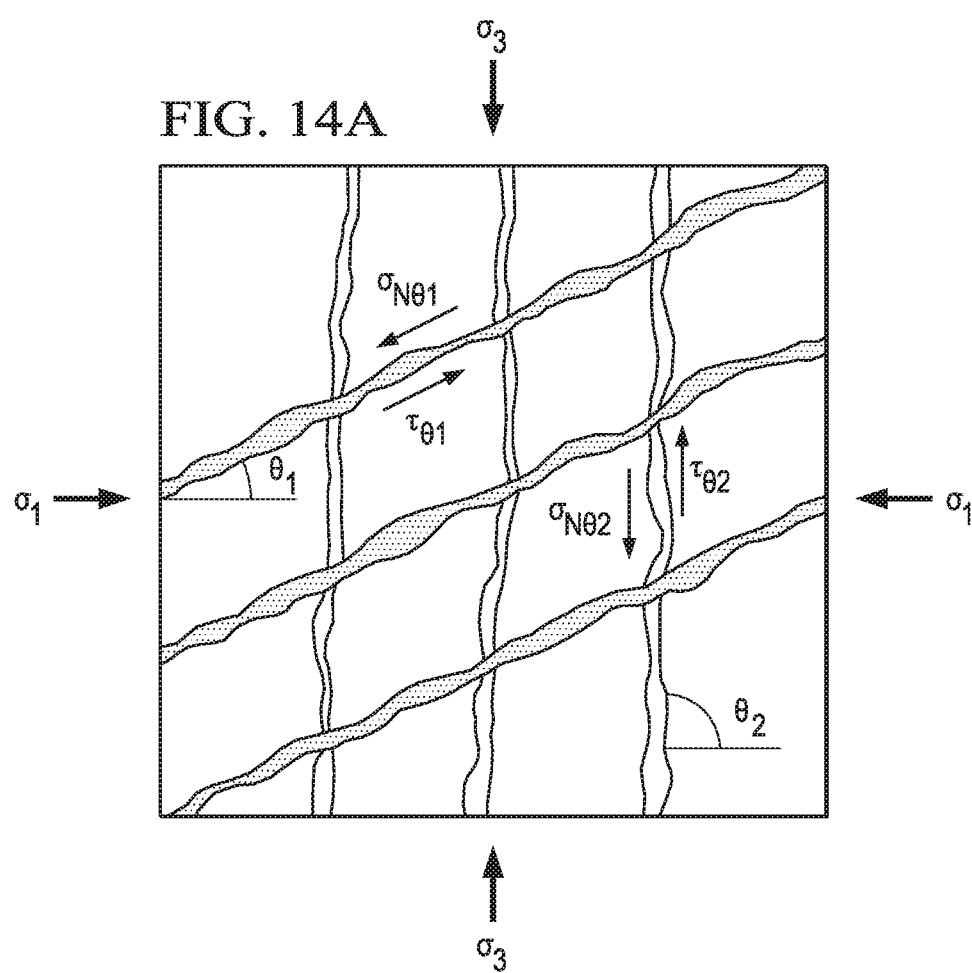
FIG. 14A is a schematic diagram of nonlinear behavior of stress conditions due to a fracture aperture in a subsurface rock formation.
Figure 14B:
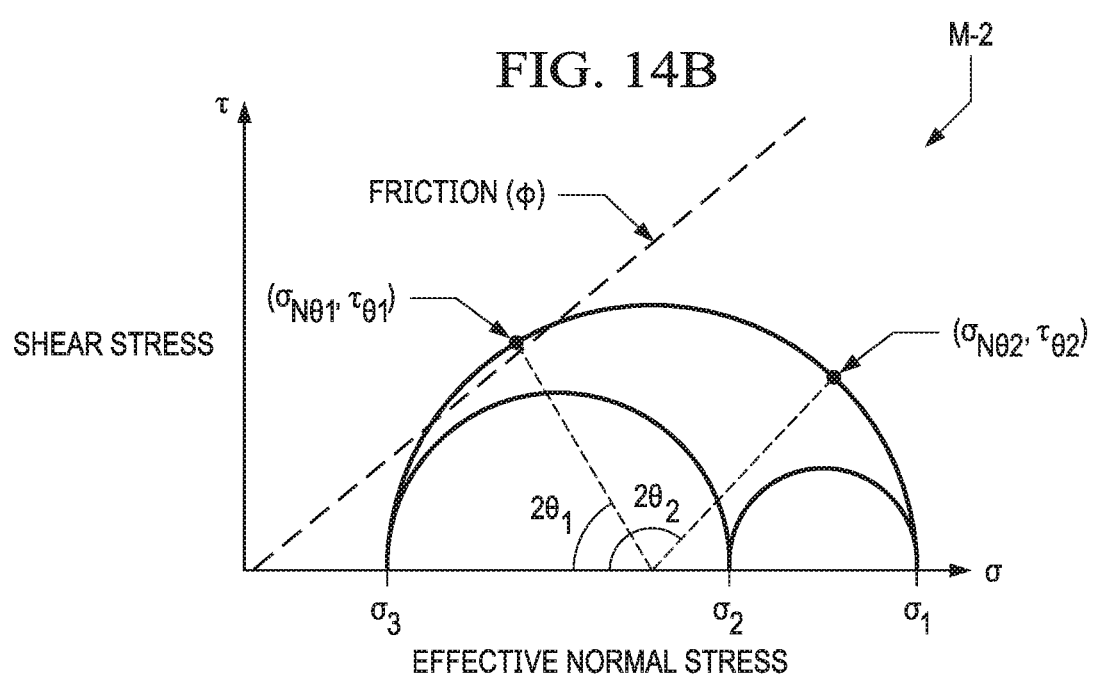
FIG. 14B is a Mohr diagram of rock coefficient of friction as a function of effective normal stress forces shown in FIG. 14A.

FIG. 14A is a schematic diagram of a fracture model F-2 and 14B is a Mohr's diagram provided as examples illustrative of the interrelation of fracture aperture orientation angle $\Theta_i$ to shear stress $\tau_{\theta_i}$; normal stress $\sigma_{n_{\theta i}}$; and rock coefficient of friction $\phi$. As indicated schematically in FIG. 14B for a fracture orientation angle $\theta_i$ the shear stress $\tau_{\theta_i}$ and normal stress $\sigma_{n_{\theta i}}$ conditions define whether the rock is or is not under critical stress according to the rock coefficient of friction $\phi$.

As indicated in FIG. 14A, fractures 340 are in critical stress. The stress conditions $\sigma_{n_{\theta i}}$ and $\tau_{\theta_1}$ are indicated for fracture orientation angle $\Theta_1$ in the Mohr's diagram of FIG. 14B. The critical stress conditions indicated in Mohr's diagram M-2 (FIG. 14B) for the fractures 340 are greater than the coefficient of friction ($\phi$). This indicates that under the formation fracture angle and critical stress condition shown in FIG. 14A, the formation rock in the fracture model F-2 is hydraulically conductive.

The equivalent aperture dilatation of normal closure and shear dilatation phenomena can be expressed according to on empirical Equations (3) and (4):

$$\text{Aperture}_{NormalClosure} \approx b_0 + b_{max} * \text{EXP}^{-\alpha \sigma_n} \quad \text{(Equation 3)}$$

$$\text{Aperture}_{Sheardilation} \approx d_{max} * \left(1 - \text{EXP}^{\left(-c * \frac{\tau - \sigma_n * \text{Tan}(\varphi)}{\sigma_{Vertical}}\right)}\right) \quad \text{(Equation 4)}$$

Where, if in Equation (4) ($\tau - \sigma n * \text{Tan}(\varphi)$)<0, then $\text{Aperture}_{Shear\ dilatation} = 0$ In Equations (3) and (4), $\tau$ is the shear stress and $\sigma_n$ is the gradient of normal stress acting in a single plane; $\varphi$ is the friction angle; $\alpha$ is a coefficient related to the fracture closure; c is a stress coefficient for dilatation; $b_0$ is the residual aperture; $d_{max}$ is maxima dilatation and $b_{max}$ is the maximum mechanical deformable mechanical aperture.

Using the previous aperture distribution, a standard cubic law function is used as expression for the stress-dependent permeability (Equation 5). The stress-dependent permeability so expressed incorporates the effects of both normal closure and shear dilation of fractures through the aperture distribution based on critical stress:

$$K \approx B * (\text{Aperture})^2 \quad \text{(Equation 5)}$$

Figure 8:
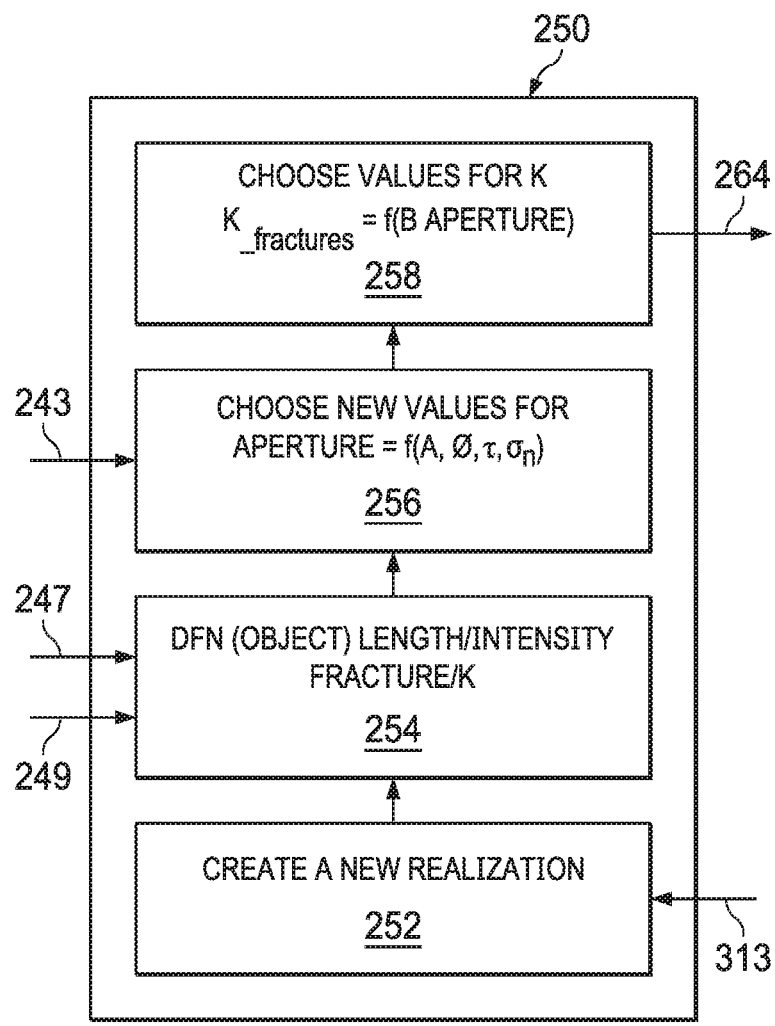
FIG. 8 is a schematic diagram of workflow of a component portion of the workflow of FIG. 4.

The B parameter for Equation (5) is calibrated using multiple realizations and comparing the resultant realizations with the dynamic well test response shown in FIGS. 8 and 9. The B parameter is a constant value parameter for the intrinsic permeability multiplier and ranges are initially assumed from theoretical correlations. The B parameter is then optimized through the workflow.

Fluid Pathways

Fracture networks usually serve as the major pathways for fluid transport in subsurface rocks, especially if the matrix is almost impermeable compared to the fractures. The partitioning of fluid flow within a fracture population relies on the spatial connectivity of fracture geometries and the transmissivity of individual fractures, both of which can be affected by the geomechanical conditions.

Figure 15A:
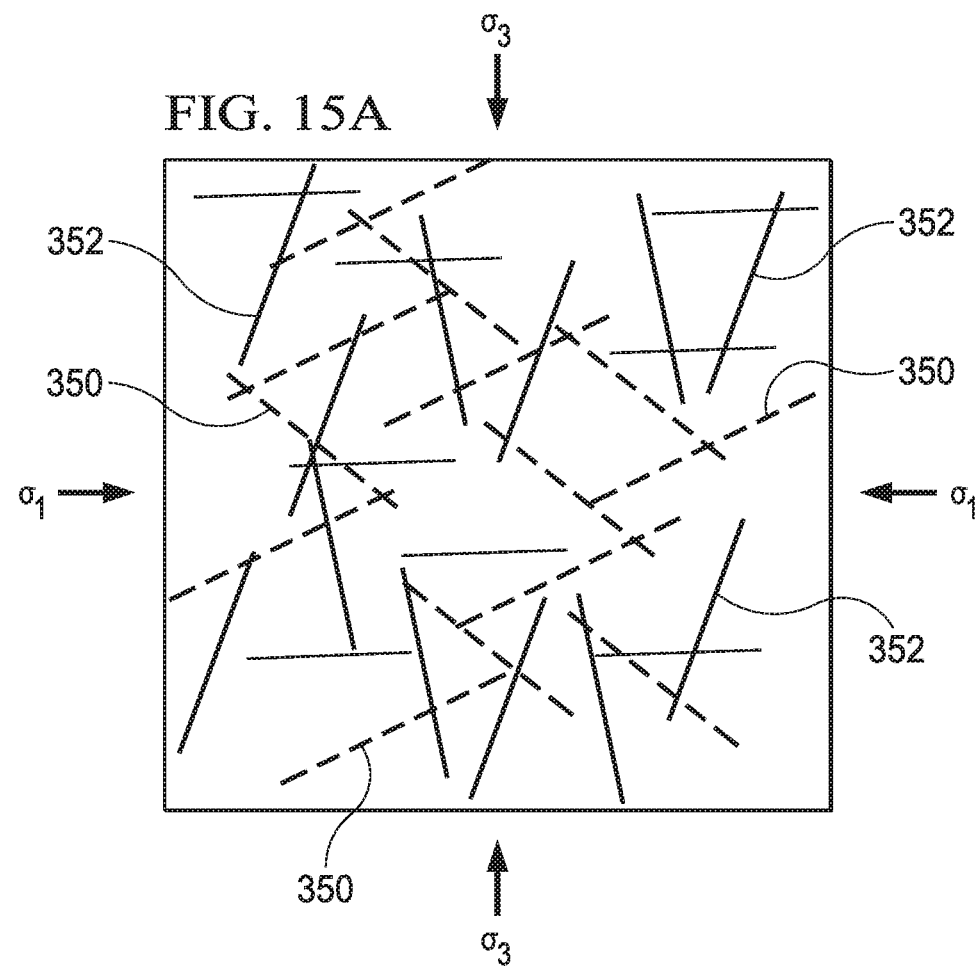
FIG. 15A is a schematic diagram of fracture flow paths in a subsurface rock as a result of critical stress conditions in the formation rock.
Figure 15B:
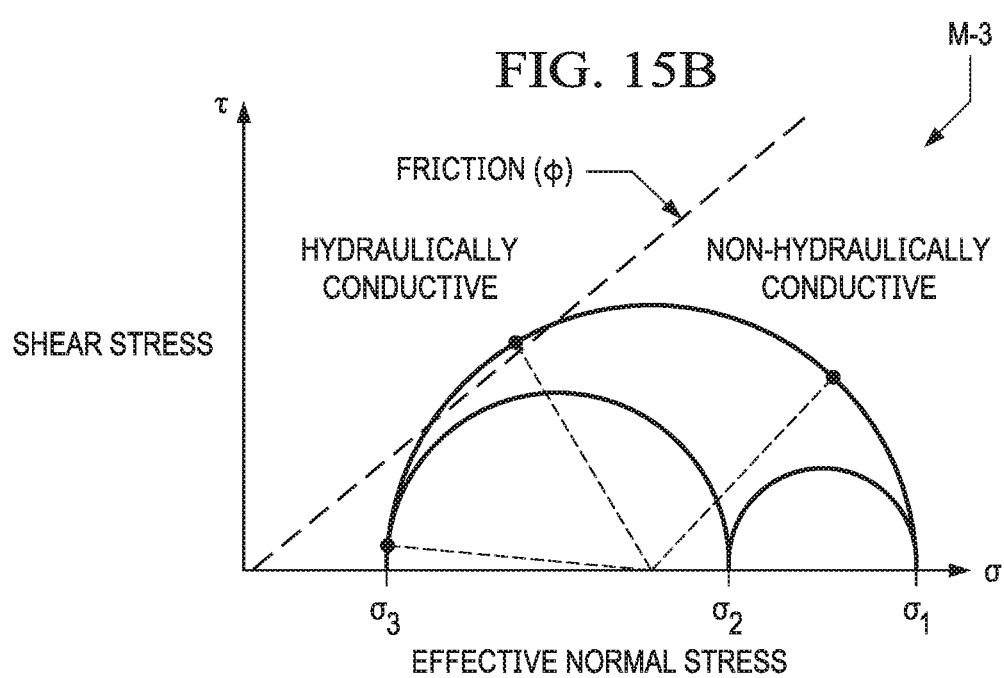
FIG. 15B is a Mohr diagram indicating which rock fracture flow paths shown in FIG. 15A are and are not hydraulically conductive as a result of stress conditions in the rock.

FIG. 15A is a schematic diagram of a formation model F-3 of fluid pathways in formation rock in a segment of a subsurface formation. FIG. 15B is a Mohr's diagram indicating critical stress conditions in certain of the fluid pathways in the formation model F-3. The stress conditions are indicated for the fluid pathways in fracture model in the Mohr's diagram of FIG. 15B. The critical stress conditions indicated in Mohr's diagram M-3 (FIG. 15B) for the certain fluid pathways are greater than the coefficient of friction ($\phi$). This indicates that under the fluid pathway angle and critical stress condition shown in FIG. 15A, the formation rock in the formation model F-3 is hydraulically conductive.

The flow paths 350 based on critical stress (FIG. 15A) which are hydraulically conductive are indicated in red, while flow paths 352 indicated in blue do not conduct fluids. The presence or absence of critical stress which affects hydraulic conductivity in natural fractures is a relationship as follows according to Equation (6) from Zoback, *Reservoir Geomechanics*, previously cited:

$$\text{Critical fractures} = (\tau - \sigma_n * \text{Tan}(\varphi)) \geq 0 \quad \text{(6)}$$

Dynamic Permeability Optimization 260

In the dynamic permeability optimization processing module 260, as indicated at step 262 static reservoir data in the form of flow capacity of the reservoir matrix $K_{facim}$ stored in memory during step 32, and rock type (PRT) stored in memory during step 34 are received and stored for further processing.

As indicated at 264, a sequence of discrete fracture realizations are generated by the discrete fracture network realization 250 are received and stored as indicated at step 266. The discrete fracture network is also during step 266 upscaled from the 3-dimensional object planes space to the geocellular gridded model. The natural fractures are represented into a 3D grid model as planes in the explicit way which contains specific aperture and intrinsic permeability, in order to convert the fracture planes in a Geocellular properties upscaling process is made using a software package such as Petrel™, Fracflow, or other suitable upscaling methodology.

The upscaling is performed to form fracture porosity distribution, transfer functions coefficients, and fracture permeability measures which are stored for further processing. The stored tensor effective permeability ($K_i$, $K_j$, $K_k$) parameter measures for the current discrete fracture network realization are provided as indicated at step 268 for determination of the flow capacity $KH_{Fract-simulate}$ of fractures in the rock matrix.

The stored reservoir data $K_{facim}$ from step 262 are provided as indicated at step 270 for comparison with the flow capacity dynamic data from production logging tool well tests. If the comparison during step 270 indicates that the well flow capacity $KH_{PTA}$ is less than the flow capacity $KH_{Fract-simulate}$ of the rock matrix, an indicator is provided as step 272 that a problem exists in the data being provided for processing.

If the comparison during step 270 indicates no problem is present in the data, processing proceeds to step 274. During step 274, the determined flow capacity $KH_{Fract-simulate}$ for the fractures in the discrete fracture network realization in the sequence currently being processed is examined. This is done to detect null values in the flow capacity $KH_{Fract-simulate}$ to identify fracture free wells as contrasted with wells which are intersecting fracture planes and exhibit a non-null determined flow capacity $KH_{Fract-simulate}$. If a null value is indicated during step 274 for the flow capacity $KH_{Fract-simulate}$ for a realization of a well, the identification of that well realization stored as indicated at 276 in a well list in memory of the data processing system D.

Wells indicated to be not intersecting fractures are treated during step 278 by conventional matrix calibration, a global multiplier is identified based on pressure transient analysis (PTA) results, and then propagated through individual grid block according to the production logging tool (PLT) flow profile distribution.

If an actual, non-null value of flow capacity is indicated in step 274, processing proceeds to step 280 for classification processing relating to processing for wells which are intersecting fractures. During step 280 the presence of high permeability streaks is evaluated using the PRT corresponding to HPS code and if a particular well is indicated to contain a high permeability streak then this can be checked through the expression PRT=HPS. If presence of high permeability streaks is indicated for a well, the well is identified during step 282 in the database memory of the data processing system D as having a high permeability streak present.

If a well is indicated that during step 280 as having no high permeability streak, the well is so identified in memory of the data processing system D as indicated at 284. Processing proceeds to step 286 to determine if the well is one which has had a production logging tool (PLT) well test performed and data obtained. For wells in which there is no PLT log data obtained, during step 288, the difference E0 between the total measured flow capacity $KH_{PTA}$ and each of the predicted flow capacity $KH_{Facim}$ and the flow capacity for fracture ($KH_{Fract-simulate}$) is determined according to the relationship:

$$E0 = KH_{PTA} - KH_{Facim} - KH_{Fract-simulate} \qquad (7)$$

When PLT log data is available from the well, the processing stage 289 follows during which parameters are defined for flow capacity determination during subsequent processing. The parameters and their designations are indicated in the drawings as follows:

$$H_{MS} = 1 - H_{FS}$$

$$PLT_F = \Sigma PLT_n$$

$$PLT_M = \Sigma PLT_{MI}$$

$$KH_{PTAF} = PLT_F KH_{PTA}$$

$$KH_{PTAM} = KH_{PTA} - KH_{PTAF}$$

The difference E1 between the fraction of the total flow capacity attributed to fractures $KH_{PTAF}$ and the accumulated flow capacity $\Sigma\, K_{FSi}\, H_{FSi}$ is determined during step 290 through the relationship:

$$E1 = (KH_{PTAF} - \Sigma K_{FSi} H_{FSi}) \qquad (8)$$

In Equation (8), the parameter $KH_{PTAF}$ represents the fraction of the total flow capacity attributed to fractures and $\Sigma K_{FSi}\, H_{FSi}$ represents the accumulated flow capacity for the PLT points being simulated (intersecting fractures).

During step 292, for well depth intervals between a well depth or PLT point at which production logging tool data are obtained in order to determine the flow contribution at a particular depth in the well, the difference Ei between the portion of flow capacity assigned from the total flow capacity to each PLT point $PLT_{Fi} \cdot KH_{PTAF}$ and the simulated flow capacity $K_{FSi}\, H_{FSi}$ is represented by the following expression:

$$Ei = (K_{FSi} H_{FSi} - PLT_{Fi} \cdot KH_{PTAF}) \qquad (9)$$

where the parameter $PLT_{Fi}$ represents the percentage of flow contribution at a single point of well depth, and $K_{FSi}\, H_F Si$ represents the flow capacity contribution for the PLT points for fractures simulated; as shown in Figure ?.

Step 294 follows, during which the difference Ei for each data point determined during step 292 are assembled into an error matrix. Processing proceeds to a minimization processing procedure as indicated at step 300 (FIGS. 9 and 19).

The minimization processing procedure is performed for each realization, and thus E0, E1, Ei are estimated. These are considered the error functions to be optimized (minimized), and minimization processing 300 is performed to select the best parameters to fit the dynamic of the formation rock to the results of the production logging tests.

Minimization Processing—Step 300

Performance of minimization processing according to step 300 minimize the differences for each realization stored in the error matrix during step 294 as error factors for each of the wells across all their connecting grid blocks in the geocellular model.

The minimization processing 300 generates a population of realizations varying the parameters controlling the fracture distribution and properties as defined by the stochastic discrete fracture network processing module 250. The number of the realizations in a single population is user defined.

Figure 16:
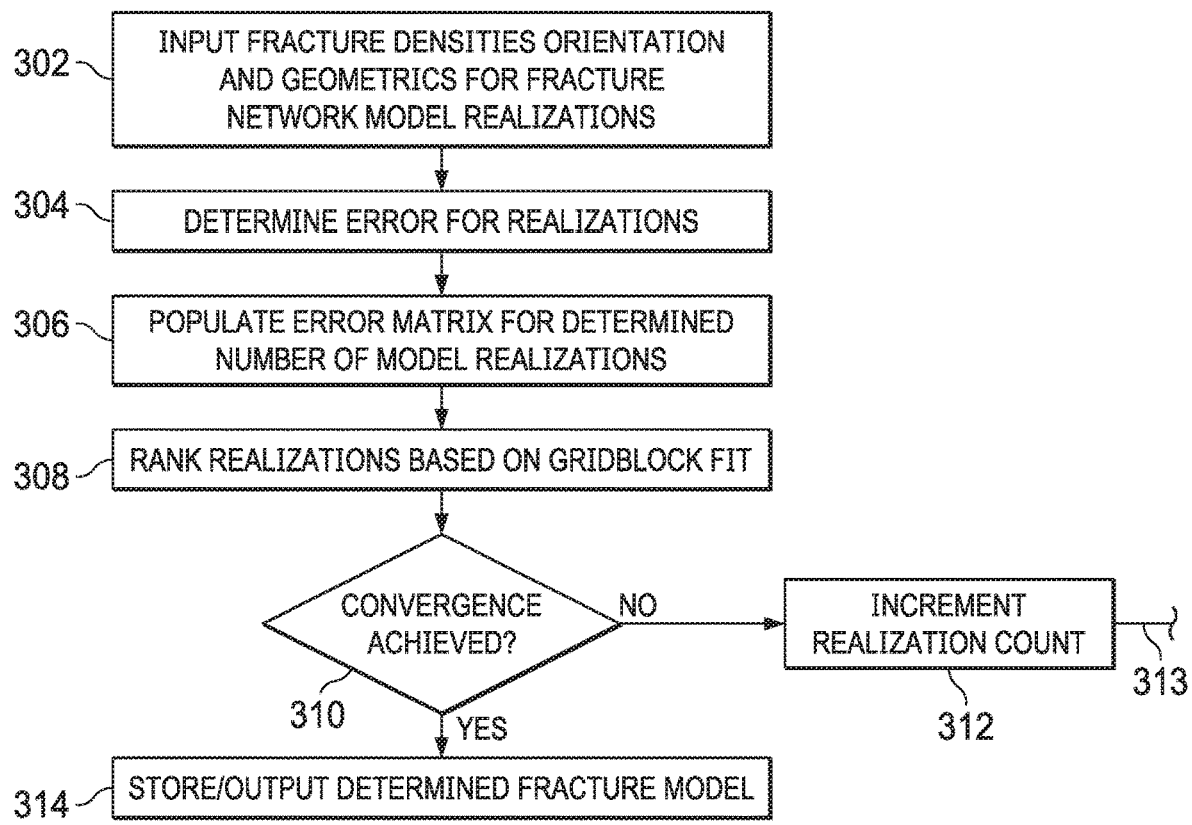
FIG. 16 is a schematic diagram of a portion of the workflow of FIG. 3 for dynamic permeability optimization for reservoir modeling of natural fracture distribution and properties according to the present invention.

The minimization processing workflow during step 300 (FIG. 16) determines the error factors and populates the error matrix for each realization. During step 302, fracture densities, orientation and geometrics from the geomechanics fracture driver 246 are received as inputs. Step 304 is performed to determine an error value between the measured flow capacity for the well and the flow capacity determined for each of the realizations. The determined error values are populated in an error matrix during step 306 and ranked during step 308 based on the different grid block fit factor in the error matrix. During step 310 a convergence test is performed to determine if the current estimate of calculated reservoir flow capacity for each realization is within user specified acceptable accuracy limits to actual measured reservoir flow capacity. If not, during step 312 a realization count is incremented and as indicated at 313 processing returns for formation of a new realization of a stochastic discrete fracture network by stochastic discrete fracture network processing 250.

This process continues iteratively until reservoir flow capacity of the model based on estimated fracture properties is within an acceptable degree accuracy with actual measured reservoir flow capacity. The degree of accuracy is user specified and is based on considerations of computer processing time requirements, prevention of iterative looping, and reservoir engineering requirements.

If during convergence step 310 each realization is within user specified acceptable accuracy limits to actual measured reservoir flow capacity the determined fracture model is stored as indicated at 314 in memory of the data processing system and provided for output analysis in connection with drilling wells during step 120 (FIG. 1).

High Permeability Streak (HPS) Calibration 320

Figure 10:
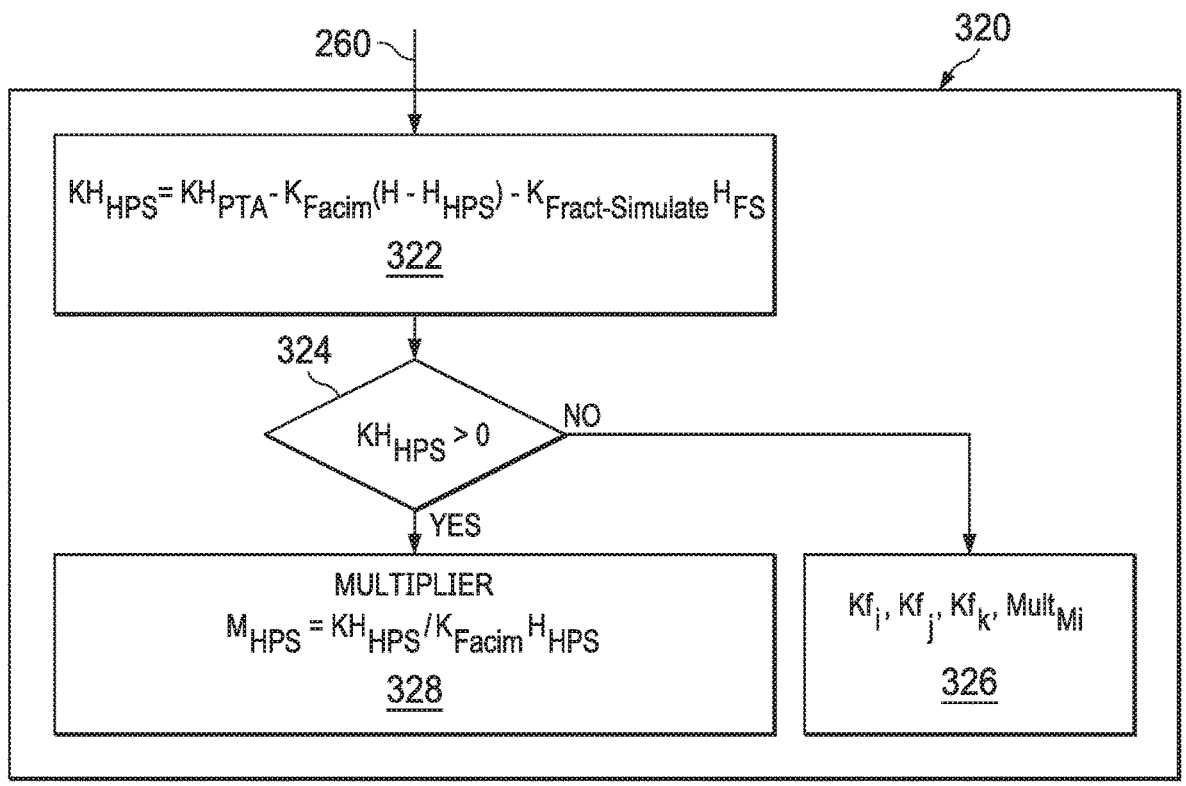
FIG. 10 is a schematic diagram of workflow of a component portion of the workflow of FIG. 4.

Once the minimization processing is satisfactorily completed, and the final configuration for the fracture distribution so determined is stored in the data processing system D, an additional high permeability streak or HPS calibration indicated at 320 in FIG. 10 is performed. The high permeability streak calibration 320 is performed for those wells which have been indicated during step 282 (FIG. 9) as passing through high permeability streaks. The difference between flow capacity from PTA, $KH_{PTA}$, flow capacity equation for HPS is calculated during step 322 through the relationship:

$$KH_{HPS}=KH_{PTA}-K_{facim}(H-H_{HPS})-K_{Fract\ simulate}HFS \quad (10)$$

The relationship of Equation 10 determined during step 322 indicates the difference between the flow capacity $KH_{PTA}$, the flow capacity from the fracture simulated high permeability streak HPS, and the flow capacity from the matrix. Step 324 is performed to determine whether $KH_{HPS}$ is less than zero then, conventional correction is prorated during step 326 through the flow profile. If the $KH_{HPS}$ is greater than zero, then a multiplier factor is formed during step 328 and applied to attribute this difference in flow capacity to the $H_{HPS}$ layers.

Data Processing System D

Figure 17:
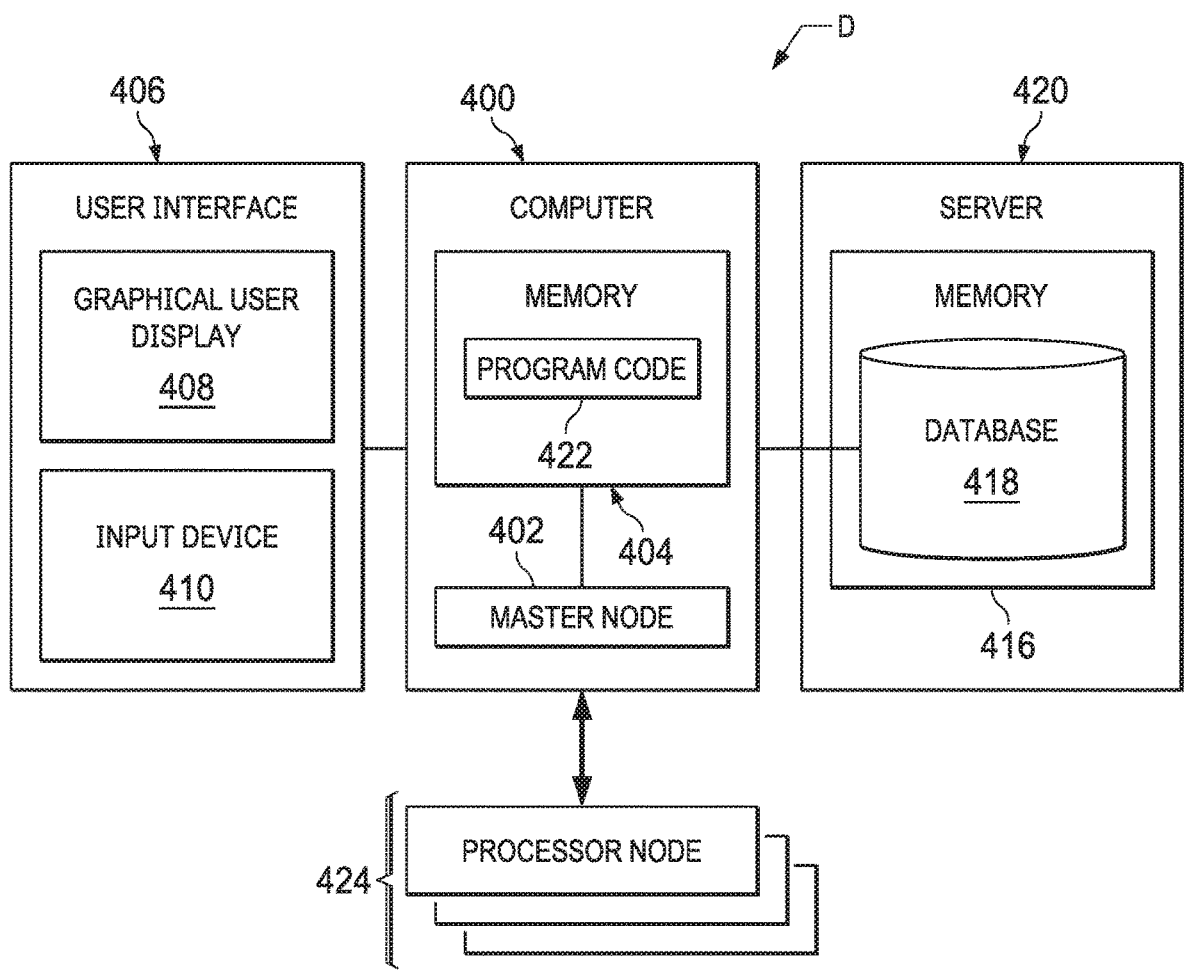
FIG. 17 is a schematic block diagram of a data processing system for calibration of earth model permeability through with estimation of natural fracture distribution and properties according to the present invention.

As illustrated in FIG. 17, the data processing system D includes a computer 400 having a master node processor 402 and memory 404 coupled to the processor 402 to store operating instructions, control information and database records therein. The data processing system D is preferably a multicore processor with nodes such as those from Intel Corporation or Advanced Micro Devices (AMD), or an HPC Linux cluster computer. The data processing system D may also be a mainframe computer of any conventional type of suitable processing capacity such as those available from International Business Machines (IBM) of Armonk, N.Y. or other source. The data processing system D may in cases also be a computer of any conventional type of suitable processing capacity, such as a personal computer, laptop computer, or any other suitable processing apparatus. It should thus be understood that a number of commercially available data processing systems and types of computers may be used for this purpose.

The computer 400 is accessible to operators or users through user interface 406 and are available for displaying output data or records of processing results obtained according to the present invention with an output graphic user display 408. The output display 408 includes components such as a printer and an output display screen capable of providing printed output information or visible displays in the form of graphs, data sheets, graphical images, data plots and the like as output records or images.

The user interface 406 of computer 400 also includes a suitable user input device or input/output control unit 410 to provide a user access to control or access information and database records and operate the computer 400. Data processing system D further includes a database of data stored in computer memory, which may be internal memory 404, or an external, networked, or non-networked memory as indicated at 416 in an associated database 418 in a server 420.

The data processing system D includes program code 422 stored in non-transitory memory 404 of the computer 400. The program code 422 according to the present invention is in the form of computer operable instructions causing the data processor 402 to form subsurface reservoir 3D geocellular models including natural fracture presence, distribution, and flow parameter properties according to the present invention in the manner set forth.

It should be noted that program code 422 may be in the form of microcode, programs, routines, or symbolic computer operable languages capable of providing a specific set of ordered operations controlling the functioning of the data processing system D and direct its operation. The instructions of program code 422 may be stored in memory 404 of the data processing system D, or on computer diskette, magnetic tape, conventional hard disk drive, electronic read-only memory, optical storage device, or other appropriate data storage device having a computer usable non-transitory medium stored thereon. Program code 422 may also be contained on a data storage device such as server 420 as a non-transitory computer readable medium, as shown.

The data processing system D may be comprised of a single CPU, or a computer cluster as shown in FIG. 17, including computer memory and other hardware to make it possible to manipulate data and obtain output data from input data. A cluster is a collection of computers, referred to as nodes, connected via a network. Usually a cluster has one or two head nodes or master nodes 402 used to synchronize the activities of the other nodes, referred to as processing nodes 424. The processing nodes 424 each execute the same computer program and work independently on different segments of the grid which represents the reservoir.

The present invention through fracture distribution optimization process identifies individual measures of both a predictive fracture model and distinctive fracture properties from matrix properties. The optimization process does not use the dynamic data as a conditioning input but as match criteria. This provides a high quality product with predictive capacity of the unknown occurrence or properties of fracture, this is a superior quality than simply reproducing the actual measured data. This will provide an early indication of the type and nature of fractures to be encountered which in turn permit adjustments and modifications of the well path or well completion method being performed. The present invention is thus integrated into a practical application in that it solves a technological problem by allowing control of drilling operations to take into account conditions of favorable presence of increased permeability in the formations of interest.

The present invention differs from previously used methods in that dynamic data from reservoir production logging tests is not used as input parameters or measures to determine fracture occurrence or permeability of the formation rock. The dynamic data is instead used as a component of an error function in an optimization processing to determine the predicted fracture model and matrix properties.

The error function formed for optimization indicates which realization of predictive fracture model and distinctive fracture properties for the formation provides a reservoir flow capacity of the model based on estimated fracture properties within an acceptable degree accuracy with actual measured reservoir flow capacity.

The present invention solves thus solves technological problem. The present invention provides measures to overcome this problem through separately determining each of natural fracture occurrence and distribution in formations for a geocellular model; formation permeability in high permeability streaks; and distinctive super permeable matrix properties.

The invention has been sufficiently described so that a person with average knowledge in the matter may reproduce and obtain the results mentioned in the invention herein Nonetheless, any skilled person in the field of technique, subject of the invention herein, may carry out modifications not described in the request herein, to apply these modifications to a determined structure, or in the manufacturing process of the same, requires the claimed matter in the following claims; such structures shall be covered within the scope of the invention.

It should be noted and understood that there can be improvements and modifications made of the present invention described in detail above without departing from the spirit or scope of the invention as set forth in the accompanying claims.

What is claimed is:

1. A method of drilling a well in a subsurface geological structure to a location in a subsurface hydrocarbon reservoir indicated by a natural fracture network model of the subsurface hydrocarbon reservoir, comprising the steps of:
   obtaining reservoir parameters representing properties of the subsurface hydrocarbon reservoir for processing in a data processing system, the reservoir parameters comprising reservoir dynamic measurements, matrix permeability, and a porosity model of the reservoir, wherein obtaining the subsurface hydrocarbon reservoir parameters comprises:
      drilling a plurality of wells in the subsurface geological structure;
      using a production logging tool in one or more of the plurality of wells to determine the reservoir dynamic measurements;
      performing a pressure transient analysis in one or more of the plurality of wells to determine the reservoir dynamic measurements;
      determining the matrix permeability from a core test and wireline log data from one or more of the plurality of wells; and
      determining the porosity model from a porosity well log from one or more of the plurality of wells;
   forming the natural fracture network model by processing the obtained reservoir parameters in the data processing system to identify fracture properties comprising the location and stress conditions of natural fractures at the locations in the subsurface hydrocarbon reservoir, by performing the steps of:
   performing a critical stress analysis comprising:
      determining critical stresses of the natural fractures using normal stress and shear stress; and
      identifying a portion of the natural fractures as hydraulically conductive based on the critical stresses;
   determining fracture distribution based on the obtained reservoir parameters;
   forming a measure of estimated fracture properties of the subsurface hydrocarbon reservoir based on the determined fracture distribution, the forming comprising:
      obtaining measures indicative of rock brittleness properties of a formation rock;
      forming a plurality of realizations of network fracture models by stochastic discrete fracture network modeling, the stochastic discrete fracture network modeling comprising:
         receiving borehole image information and the rock brittleness properties of the formation rock;
         forming a discrete fracture network representing parameters of fracture length and intensity; and
         forming values for a fracture aperture, the values comprising area, porosity, shear stress, and effective normal stress;
   obtaining based on the formed estimate of reservoir fracture properties an estimated reservoir flow capacity;
   obtaining an indicated flow capacity of the subsurface hydrocarbon reservoir;
   comparing the estimated reservoir flow capacity with the indicated flow capacity of the subsurface hydrocarbon reservoir; and
   drilling an additional well in the subsurface geological structure to a location in the subsurface hydrocarbon reservoir based on the estimated reservoir flow capacity being within the specified acceptable limit of accuracy of the indicated flow capacity and the portion of the natural fractures being identified as hydraulically conductive from the critical stress analysis to avoid formations or layers regions not indicated to be hydraulically conductive and to avoid areas indicated to contain fractures likely to cause complications in the drilling or otherwise adversely impact the drilling.

2. The method of claim 1, wherein the identified fracture properties in the subsurface geological structure indicate formation stress conditions conducive to increased production of hydrocarbons from the subsurface hydrocarbon reservoir.

3. The method of claim 1, wherein the step of forming the measure of estimated fracture properties includes the step of:
   obtaining measures indicative of the presence of critical stress condition fractures in the formation rock.

4. The method of claim 1, wherein the step of forming the measure of estimated fracture properties includes the step of:
   obtaining natural fracture descriptions of the fractures in the formation rock.

5. The method of claim 1, wherein the step of comparing the estimated reservoir flow capacity with indicated flow capacity of the reservoir comprises:
   optimizing the plurality of realizations of network fracture models with the indicated flow capacity of the reservoir.

6. The method of claim 1, further including the step of obtaining the indicated flow capacity of the reservoir from production logging measurements from the well.

7. The method of claim 1, wherein the well is indicated as passing through a high permeability streak, and further including the step of:
   forming a measure of reservoir flow capacity from the high permeability streak.

8. The method of claim 1, wherein the reservoir parameters comprise seismic attributes from seismic surveys of the subsurface geological structure.

9. The method of claim 1, wherein the reservoir parameters comprise rock and mechanical properties from geological models of the subsurface geological structure.

10. The method of claim 1, wherein the reservoir parameters comprise structural restoration models of the subsurface geological structure.

11. The method of claim 1, wherein the reservoir parameters comprise rock geological characterizations of the subsurface geological structure.

12. The method of claim 1, wherein the reservoir parameters comprise reservoir engineering measures obtained from production from the subsurface hydrocarbon reservoir.

* * * * *